(12) United States Patent
Lu et al.

(10) Patent No.: US 9,350,456 B2
(45) Date of Patent: May 24, 2016

(54) METHOD FOR IMPROVING LUMINOUS INTENSITY ADAPTABILITY AND DEVICE THEREOF

(71) Applicant: FEITIAN TECHNOLOGIES CO., LTD., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 0 days.

(21) Appl. No.: 14/116,140

(22) PCT Filed: Dec. 21, 2012

(86) PCT No.: PCT/CN2012/087098
§ 371 (c)(1),
(2) Date: Nov. 7, 2013

(87) PCT Pub. No.: WO2013/185458
PCT Pub. Date: Dec. 19, 2013

(65) Prior Publication Data
US 2015/0110503 A1    Apr. 23, 2015

(30) Foreign Application Priority Data
Jun. 14, 2012 (CN) .......................... 2012 1 0195894

(51) Int. Cl.
H04B 10/564    (2013.01)
H04B 10/50    (2013.01)
G01J 1/44    (2006.01)

(52) U.S. Cl.
CPC .................. *H04B 10/564* (2013.01); *G01J 1/44* (2013.01); *H04B 10/501* (2013.01)

(58) Field of Classification Search
CPC ........ H04B 10/564; H04B 10/501; G01J 1/44
USPC ........................................................ 250/206
See application file for complete search history.

(56) References Cited

U.S. PATENT DOCUMENTS

| 4,155,004 A * | 5/1979 | Schulz .................... E21D 23/00 250/201.7 |
| 9,253,845 B2 * | 2/2016 | Davies ............... H05B 33/0851 |
| 2009/0109688 A1 | 4/2009 | Hsu et al. |
| 2010/0096534 A1 | 4/2010 | Gharagozloo |

FOREIGN PATENT DOCUMENTS

| CN | 102042872 A | 5/2011 |
| CN | 102097056 A | 6/2011 |

(Continued)

*Primary Examiner* — Seung C Sohn
(74) *Attorney, Agent, or Firm* — Ohlandt, Greeley, Ruggiero & Perle, LLP

(57) ABSTRACT

The invention discloses a method for improving luminous intensity adaptability and a device thereof, relating to photoelectronic communication field. In the method, the device is configured with more than one level load resistors, the device collects voltage value and if the device collects predetermined numbers of voltage values which meet some requirement, it computes an average value of all collected voltage values, sets voltage value according to the average value, determines whether the set voltage is satisfied with a predetermined requirement, if yes, collects data according to the set voltage; otherwise, switches the load resistor according to a predetermined rule, in which the load voltage has influence on collecting voltage. The invention has advantages of improving luminous intensity adaptability of a screen when collecting optical signal and reducing rate of error codes.

7 Claims, 21 Drawing Sheets

(56) References Cited

FOREIGN PATENT DOCUMENTS

| CN | 102737608 | A | 10/2012 |
| JP | 2009222675 | A | 10/2009 |
| JP | 2010175572 | A | 8/2010 |

\* cited by examiner

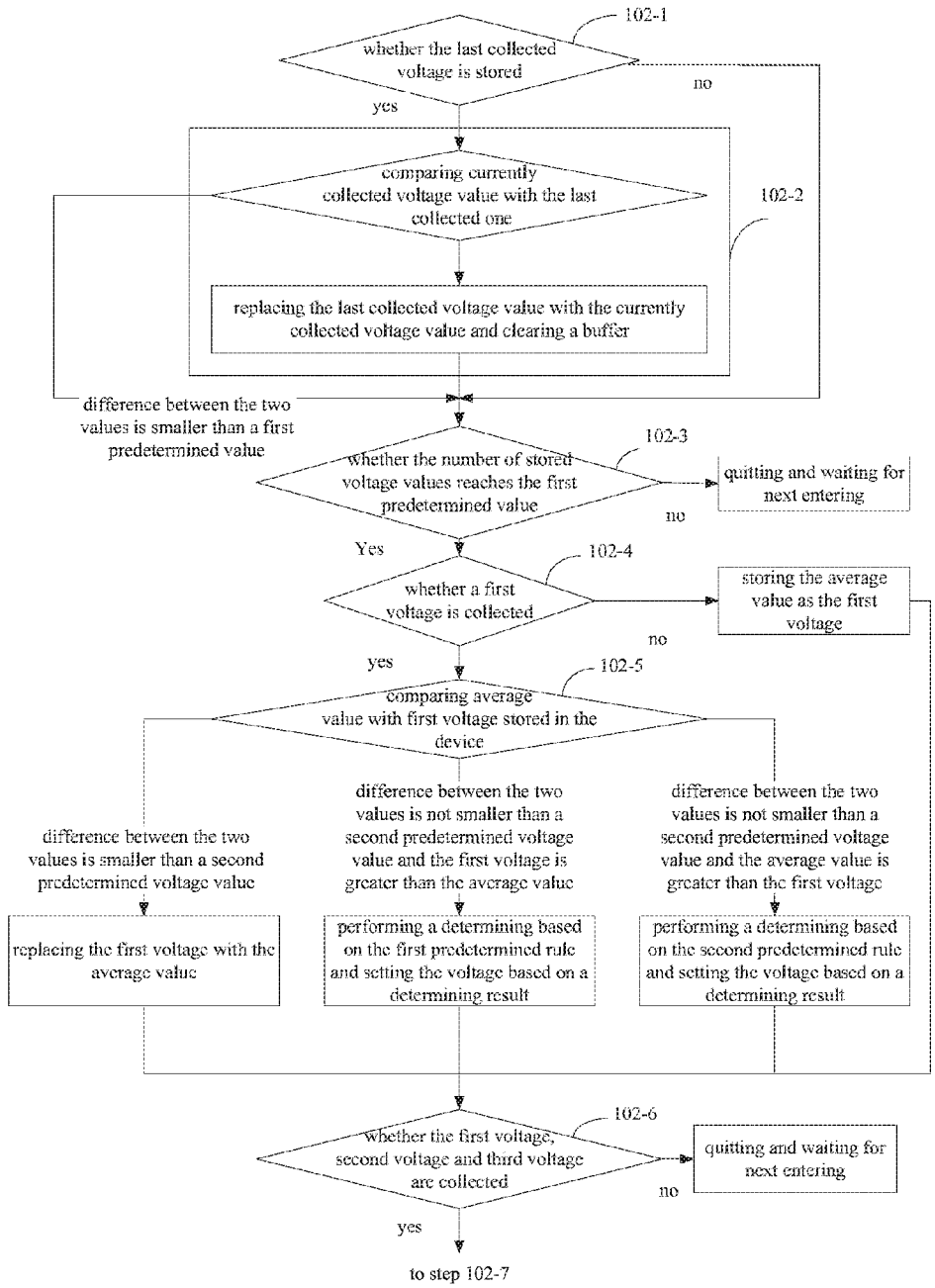
FIG. 5-a

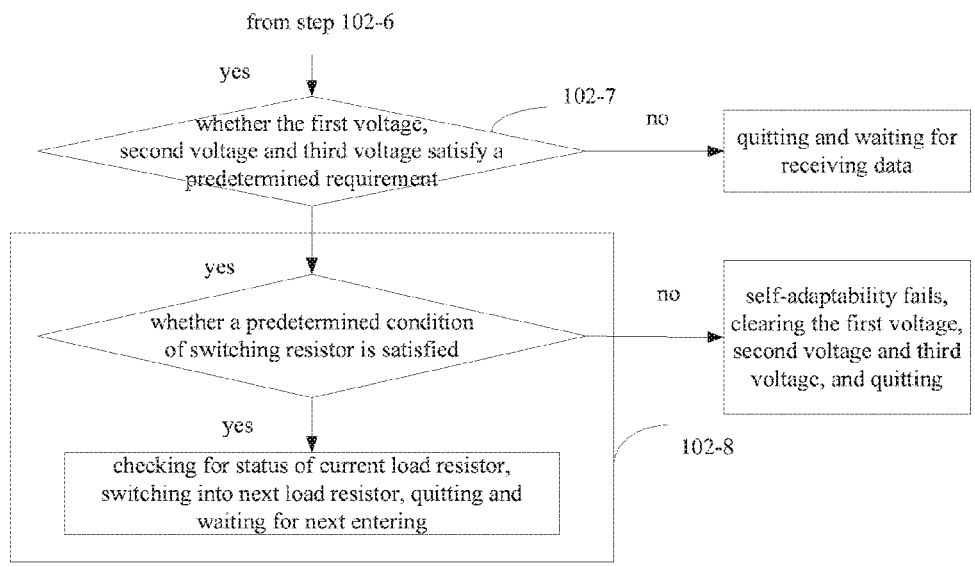
FIG. 5-b

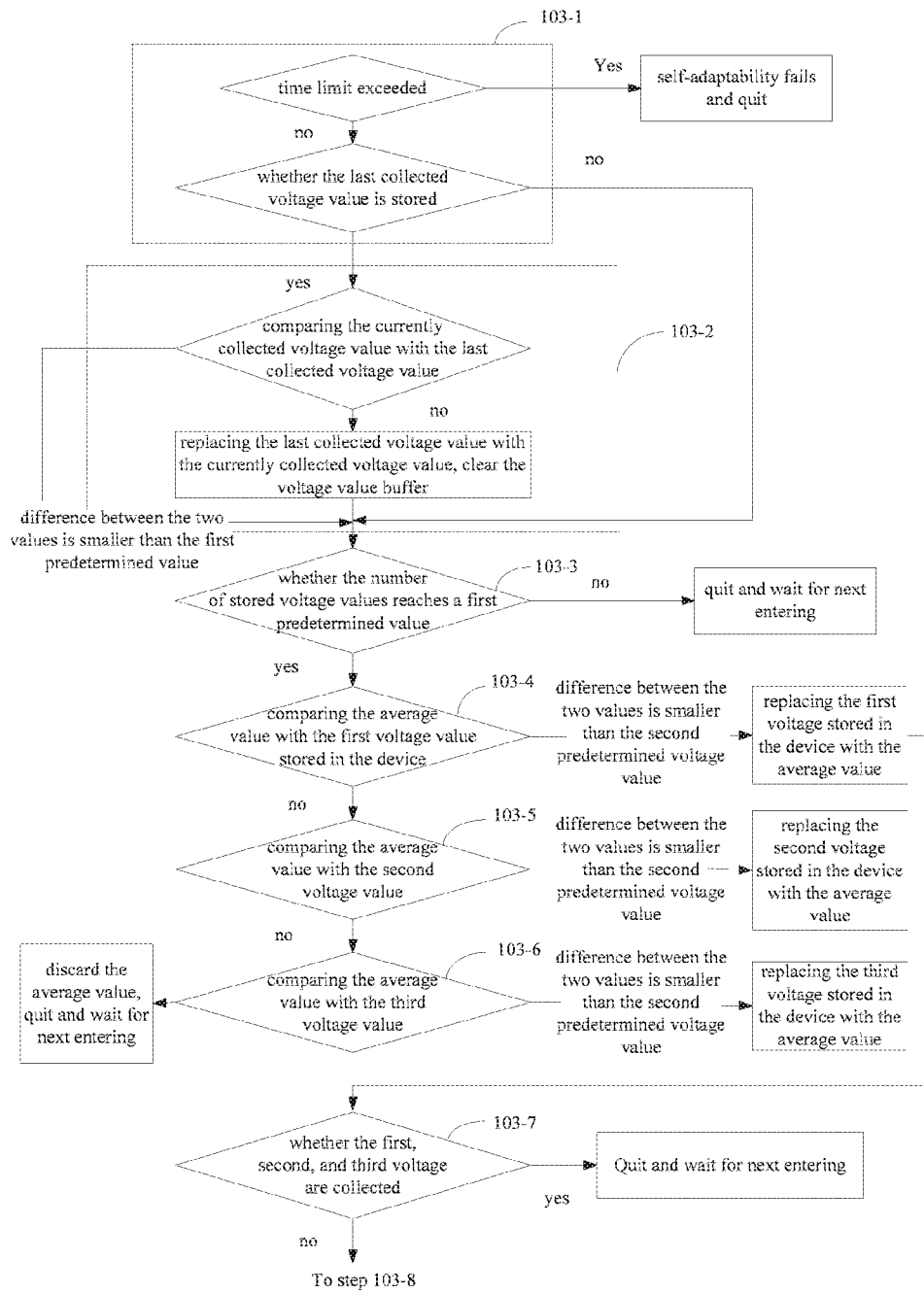
FIG. 6-a

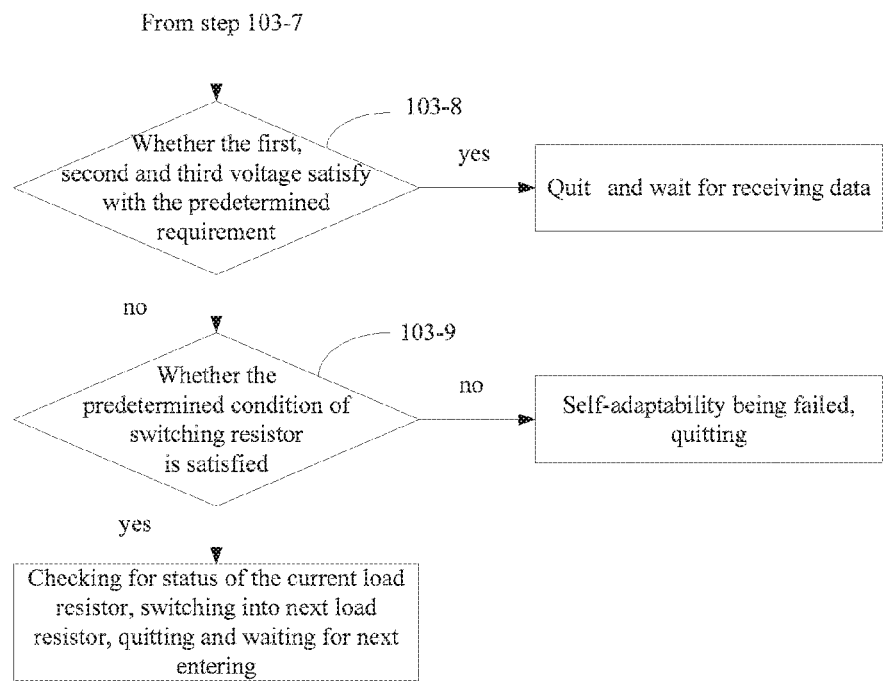
FIG. 6-b

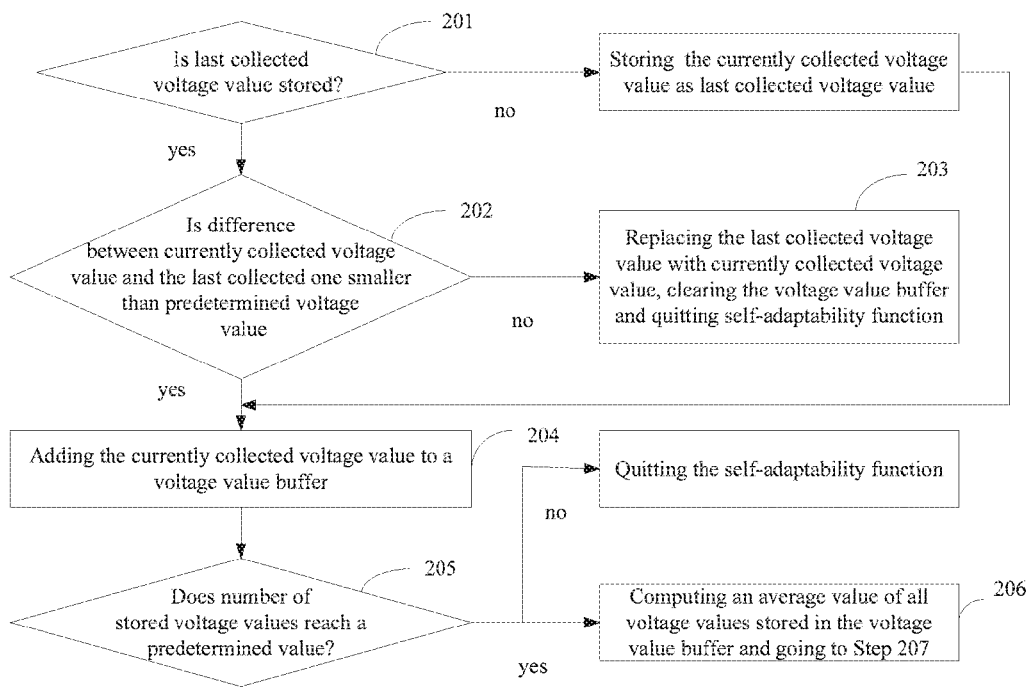
FIG. 8-a

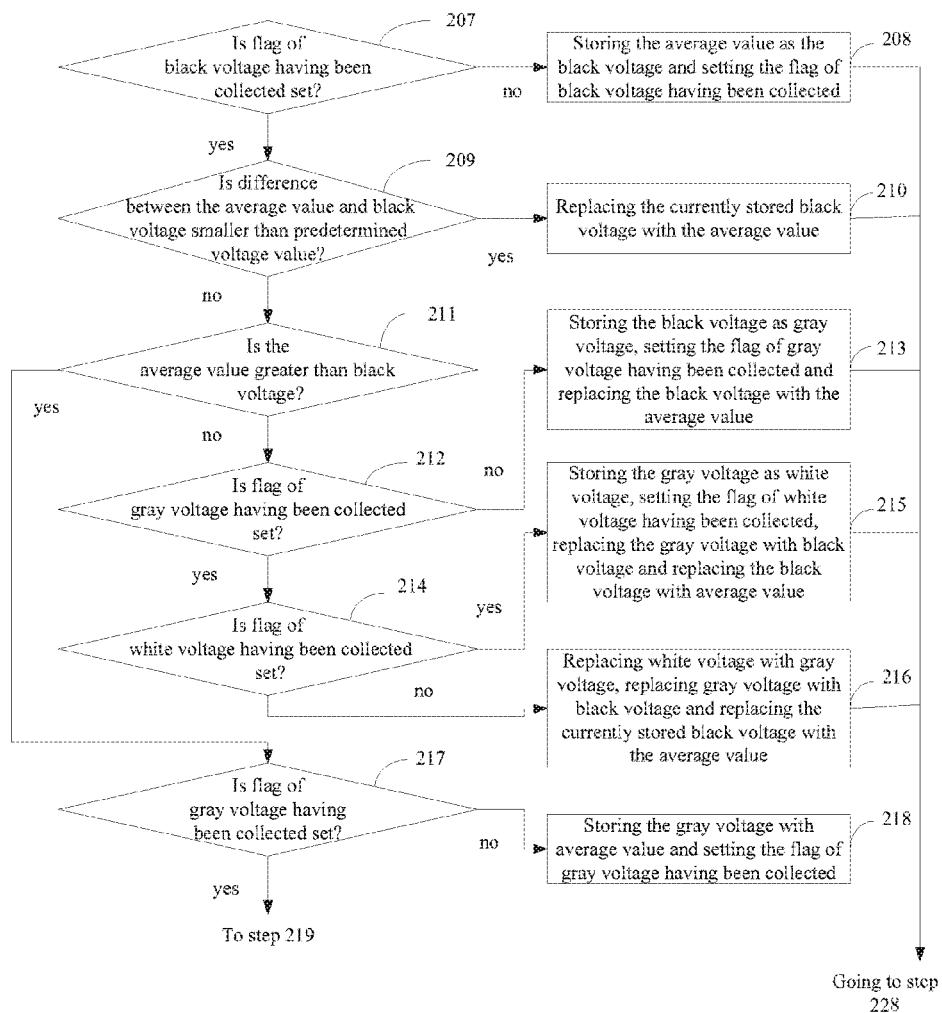
FIG. 8-b

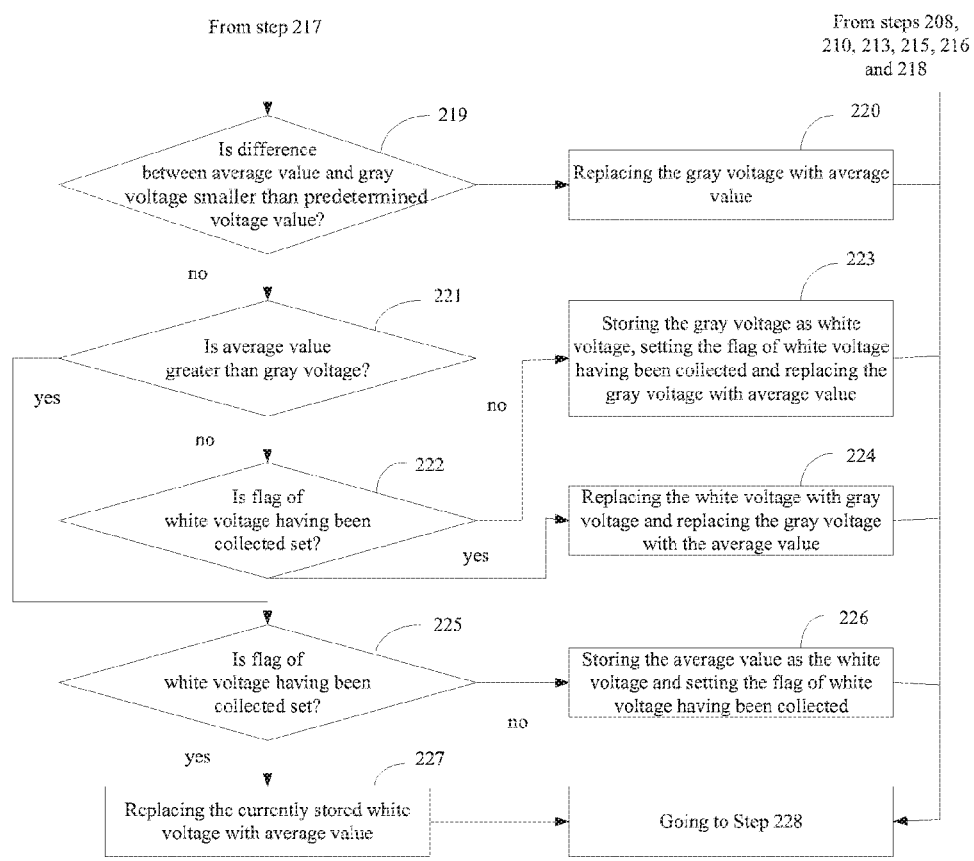
FIG. 8-c

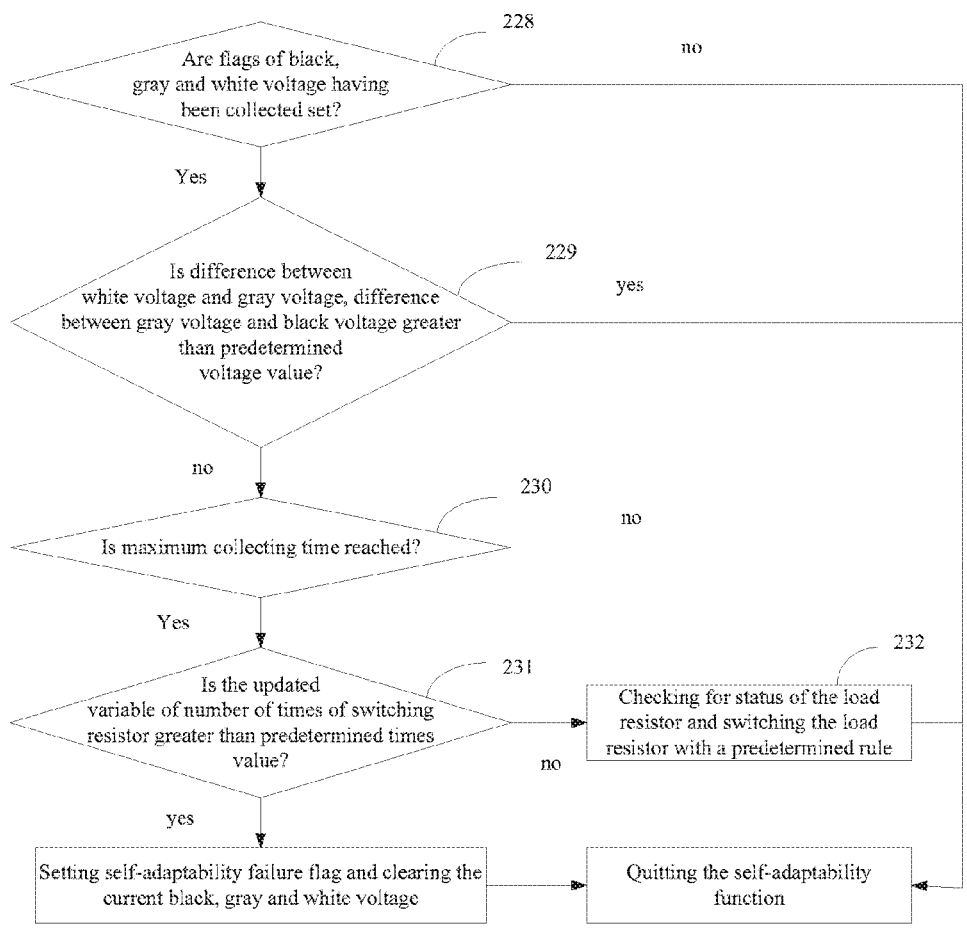
FIG. 8-d

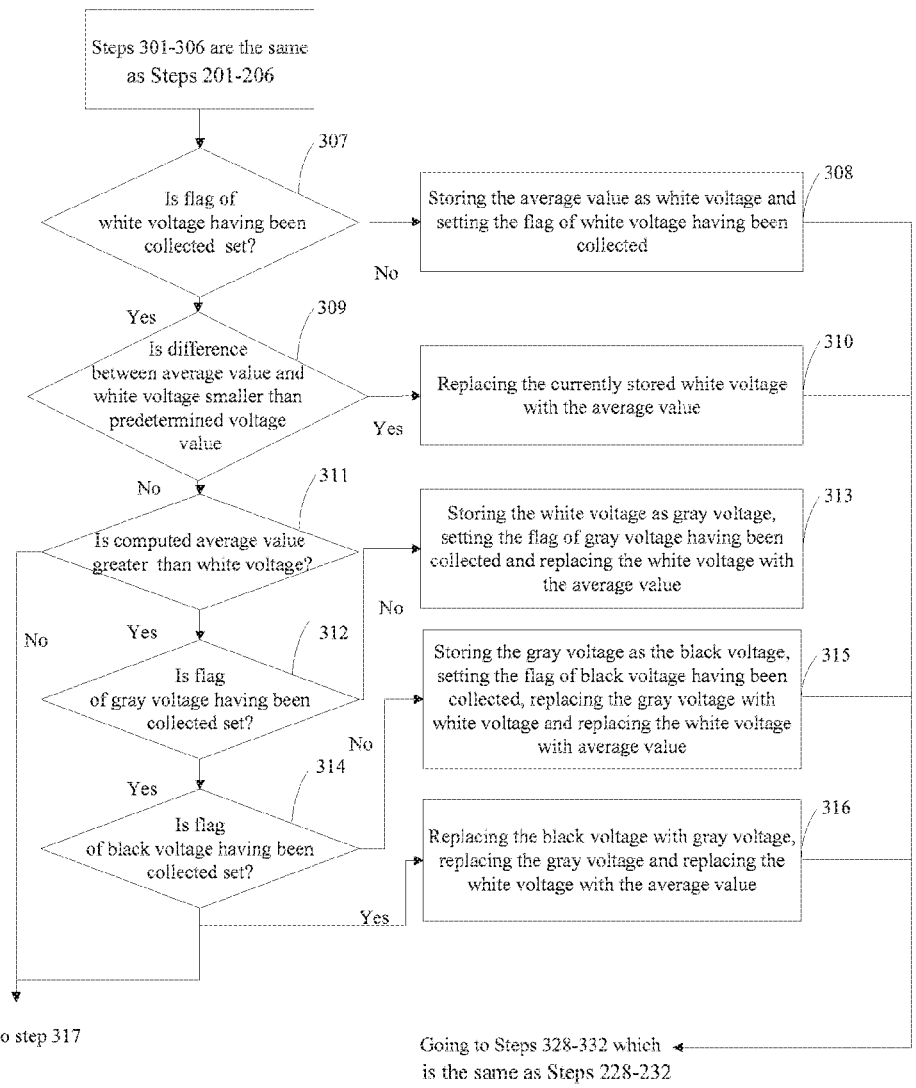
FIG. 9-a

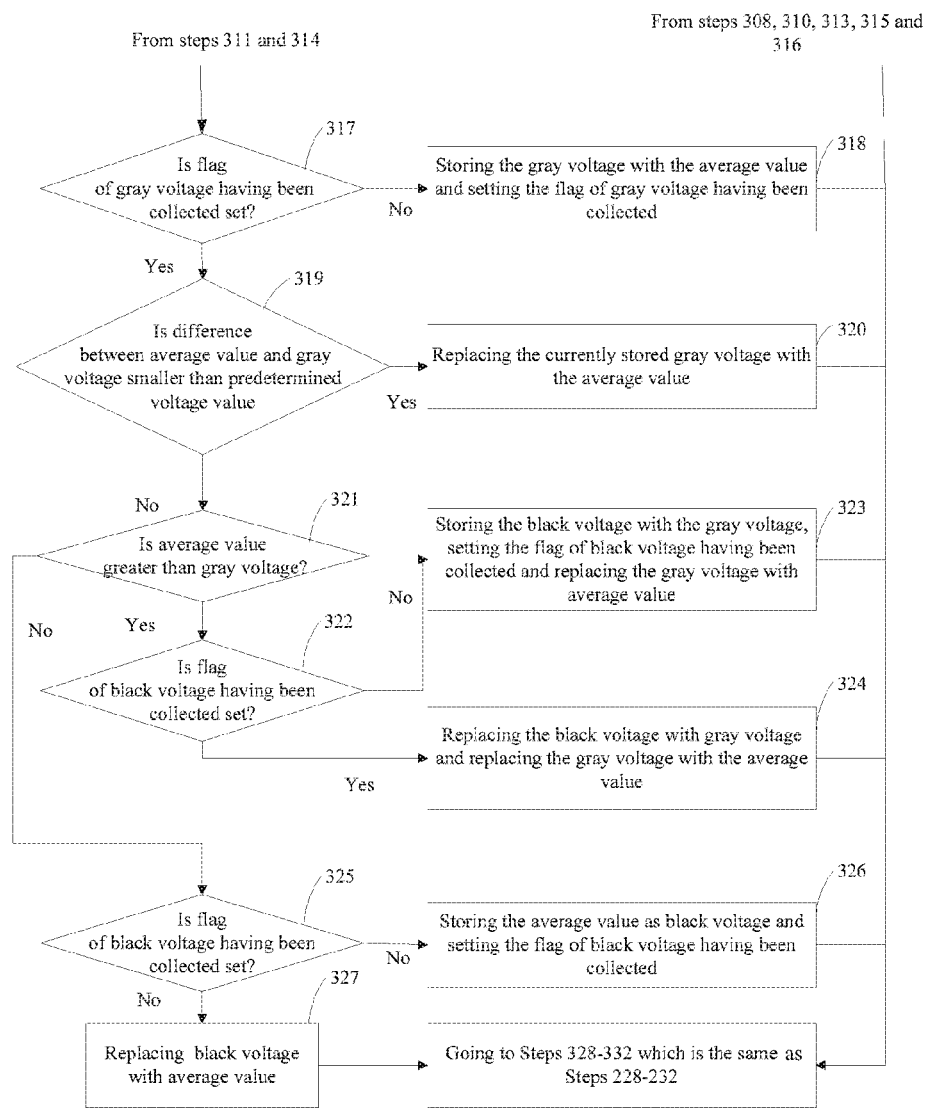
FIG. 9-b

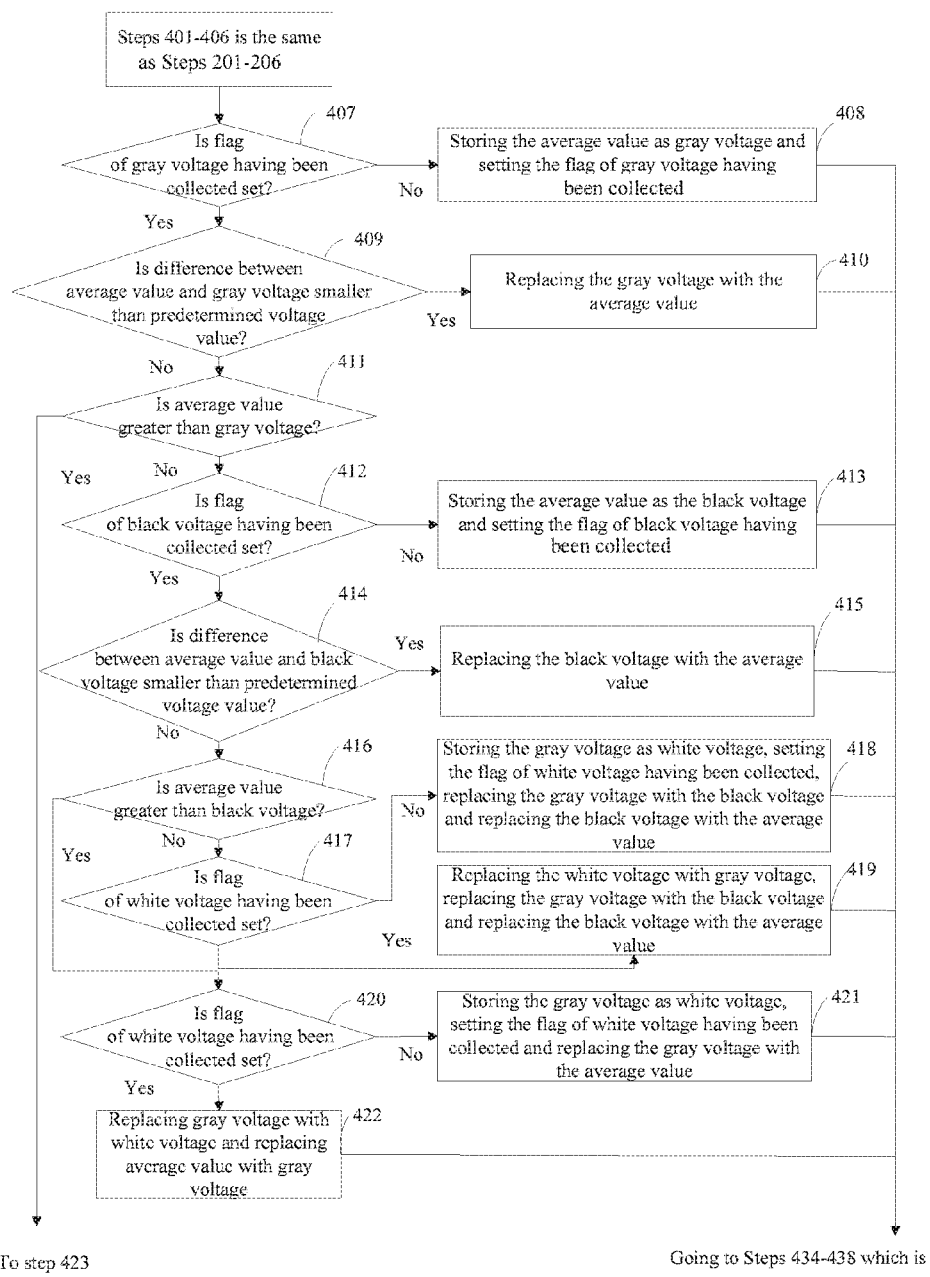
FIG. 10-a

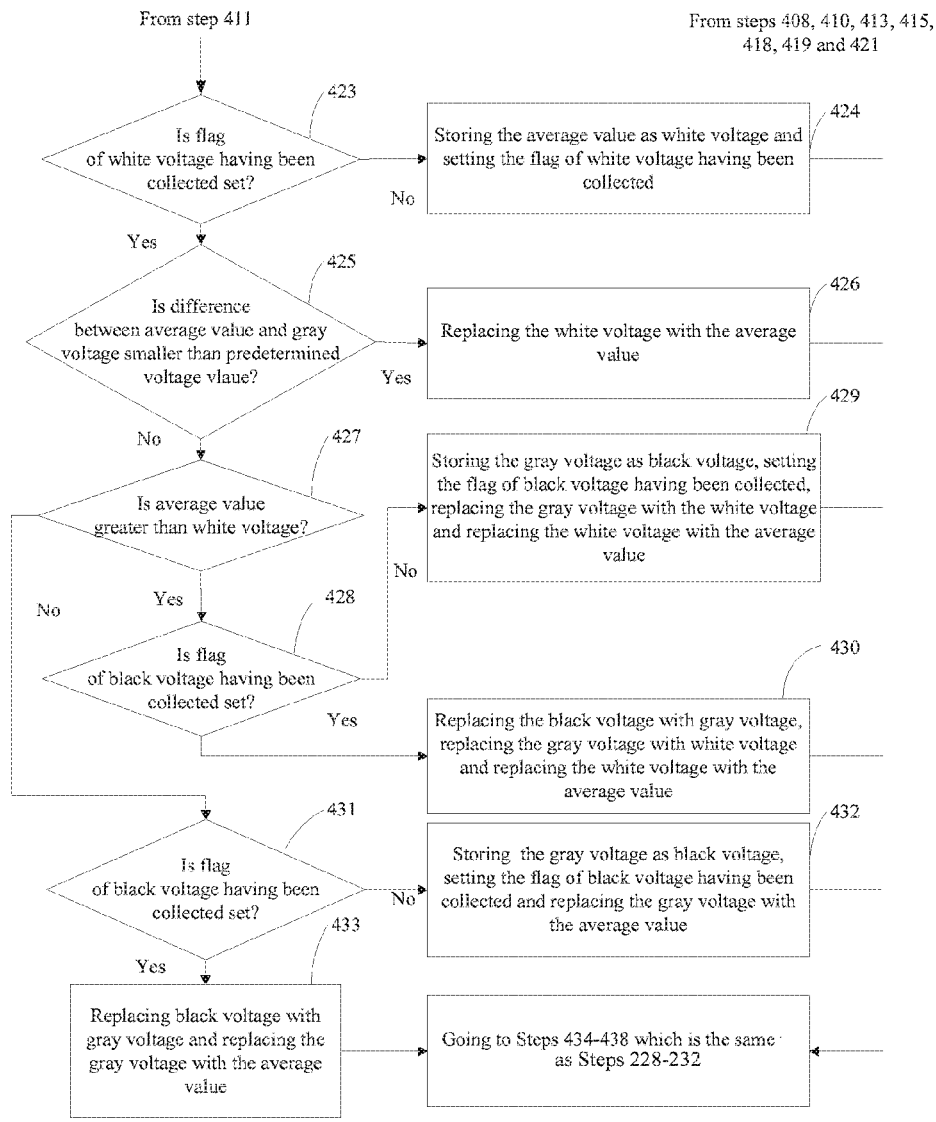
FIG. 10-b

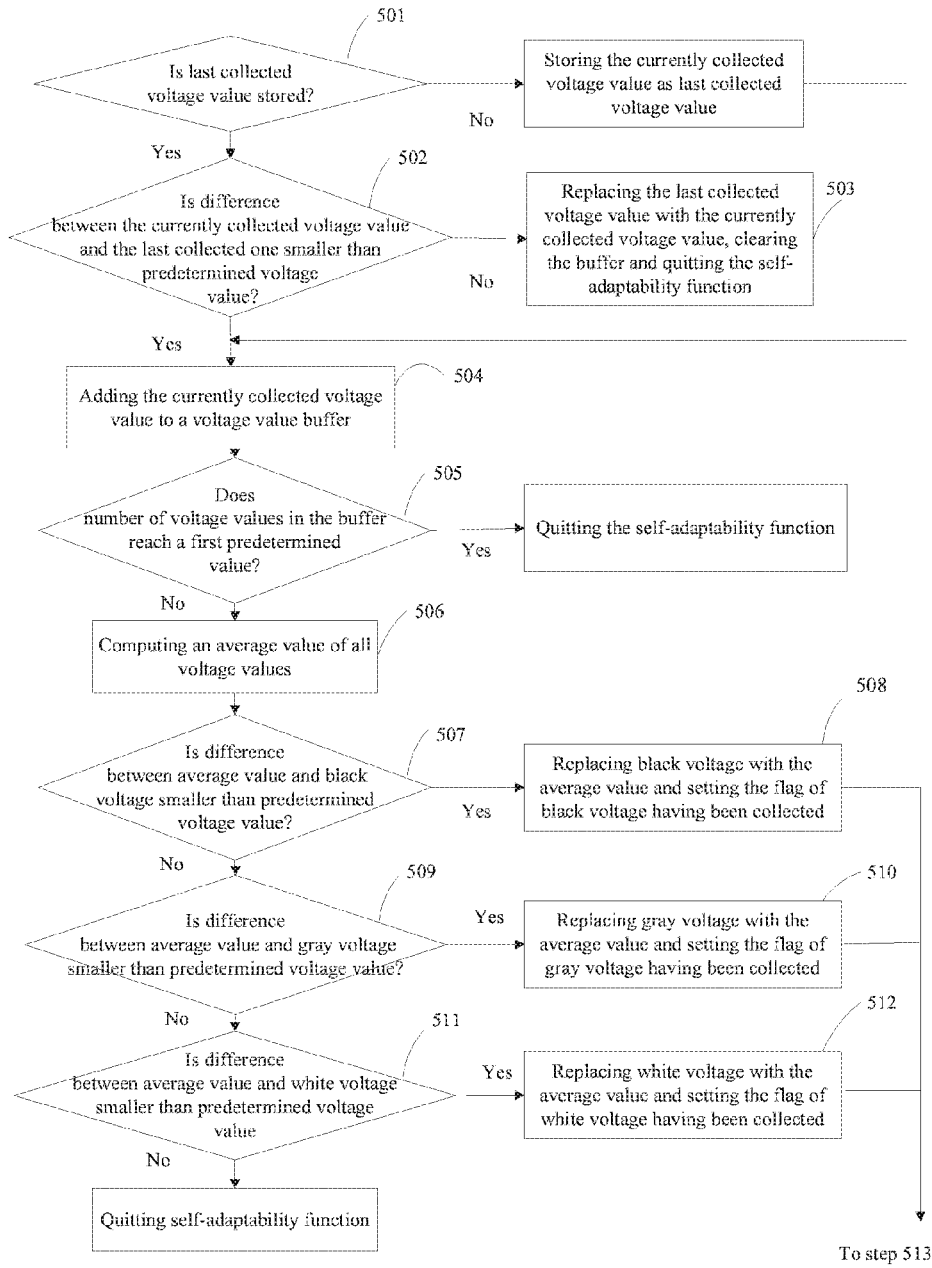
FIG. 11-a

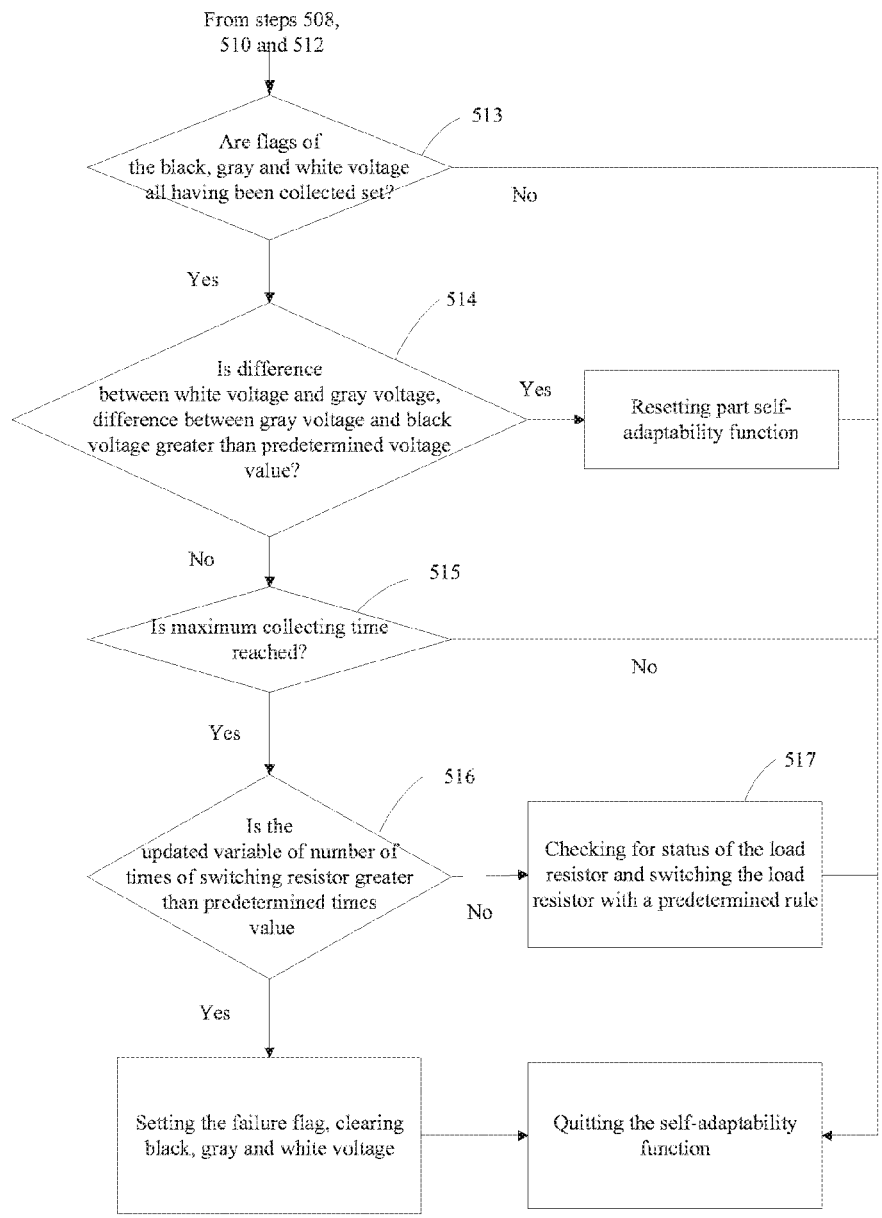
FIG. 11-b

METHOD FOR IMPROVING LUMINOUS INTENSITY ADAPTABILITY AND DEVICE THEREOF

FIELD OF THE INVENTION

The invention relates to photo-electronic communication field and particularly relates to a method for improving luminous intensity adaptability and a device thereof.

BACKGROUND OF THE INVENTION

In the current market, a display screen quite differs from a mobile phone screen, luminous range of the display screen also differs from luminous range of the mobile phone, and display effect of a screen is influenced greatly by environment. The present optical elements are mostly current-driven and sense luminous intensity by matching an appropriate load resistor. Disadvantage of the present optical elements is: it is difficult to determine resistance of the load resistor in the case that there is a big change in range of luminous intensity. Even the resistance of the load resistor is determined, since the resistance is a constant value, therefore there is a small adaptability range of the resistance on luminous intensity.

SUMMARY OF THE INVENTION

In consideration of shortcomings in prior art, in order to improve luminous intensity adaptability of a screen during collecting optical signal, a method for improving luminous intensity adaptability and a device thereof are provided according to the present invention.

The solution of the present invention is disclosed as follows.

A method for improving luminous intensity adaptability of an optical signal collecting device is disclosed. The device controls a predetermined load resistor to conduct upon receiving a self-adaptability request, the device collects and sets voltage upon being satisfied with a predetermined condition, and the load resistor has an influence on collecting of the voltage. The method includes:

Step a, determining whether a self-adaptability is failed, if yes, restoring modifications on flags, variables and load resistors, prompting error and quitting, otherwise, collecting a voltage value and if the device stores a last collected voltage value, going to Step b; otherwise going to Step c;

Step b, comparing currently collected voltage value with a last collected voltage value, if difference between the two values is smaller than a predetermined voltage value, going to Step c; otherwise replacing the last collected voltage value with the currently collected voltage value, clearing a voltage value buffer and going to Step c;

Step c, adding the currently collected voltage value to the voltage value buffer and determining whether number of voltage values stored in the voltage value buffer reaches a first predetermined value, if yes, going to Step d; otherwise, quitting and waiting for next entering;

Step d, computing an average value of all voltage values stored in the voltage value buffer and determining whether a first voltage is reached, if yes, going to Step e; otherwise storing the computed average value as first voltage and going to Step f;

Step e, comparing the computed average value with the first voltage stored in the device, if difference between the two values is smaller than a second predetermined voltage value, replacing the first voltage stored in the device with the computed average value and going to Step f; if difference between the two values is not smaller than the second predetermined voltage value and the later is greater, setting voltage according to a first predetermined rule and going to Step f; if difference between the two values is not smaller than the second predetermined voltaic value and the former is greater, setting the voltage according to a second predetermined rule and going to Step f;

Step f, determining whether the first voltage, a second voltage and a third voltage are all collected, if yes, going to Step g; otherwise, quitting and waiting for next entering;

Step g, determining whether the first voltage, the second voltage and the third voltage stored in the device are all satisfied with a predetermined requirement, if yes, quitting and the device waiting for receiving data; otherwise going to Step h; and Step h, determining whether a predetermined condition of switching resistor is satisfied with, if yes, checking for status of the current load resistor, switching into a next load resistor according to a predetermined rule, quitting and waiting for next entering and collecting voltage according to the next load resistor; otherwise, the self-adaptability being failed, clearing the first voltage, the second voltage and the third voltage stored in the device and quitting; wherein the predetermined condition of switching resistor is that times of switching resistor does not reach a second predetermined value.

In case that the device stores the first voltage, the second voltage and the third voltage in a voltage value high-to-low order of, the third voltage, the second voltage and the first voltage, correspondingly, the setting voltage according to a first predetermined rule includes:

(1), determining whether the second voltage is collected, if yes, going to (2); otherwise replacing the first voltage stored in the device with the computed average value, storing the first voltage stored in the device as the second voltage and going to Step f; and (2), determining whether the third voltage is collected, if yes, replacing the third voltage stored in the device with the second voltage stored in the device and replacing the second voltage stored in the device with the first voltage stored in the device and replacing, the first voltage stored in the device with the computed average value and going to Step f; otherwise, storing the second voltage stored in the device as the third voltage and replacing the second voltage stored in the device with the first voltage stored in the device and replacing the first voltage stored in the device with the computed average value and going to Step f;

the setting voltage according to a second predetermined rule includes:

(1), determining whether the second voltage is collected, if yes, going to (2); otherwise, storing the computed average value as the second voltage and going to Step f;

(2), comparing the computed average value with the second voltage stored in the device, if difference between the two values is smaller than the second predetermined voltage value, replacing the second voltage stored in the device with the computed average value and going to Step f; if difference between the two values is not smaller than the second predetermined voltage value and the second voltage value stored in the device is greater, going to (3) subsequently; and if difference between the two values is not smaller than the second predetermined voltage value and the computed average value is greater, going to (4);

(3), determining whether the third voltage is collected, if yes, replacing the third voltage stored in the device with the second voltage stored in the device and replacing the second voltage stored in the device with the computed average value and going to Step f; otherwise, storing the second voltage stored in the device as the third voltage and replacing the second voltage stored in the device with the computed average value and going to Step f; and (4), determining whether the third voltage is collected, if yes, replacing the third voltage stored in the device with the computed average value and going to Step f; otherwise, storing the computed average value as the third voltage, and going to Step f;

and the predetermined requirement is that both difference between the third voltage stored in the device and the second voltage stored in the device and difference between the second voltage stored in the device and the first voltage stored in the device are greater than a third predetermined voltage value.

The device stores the first voltage, the second voltage and the third voltage in a voltage value high-to-low order of, the third voltage, the first voltage and the second voltage, correspondingly, the setting voltage according to a first predetermined rule includes:

(1), determining whether the second voltage is collected, if yes, going to (2); otherwise, storing the computed average value as the second voltage and going to Step f;

(2), comparing the computed average value with the second voltage stored in the device, if difference between the two values is smaller than the second predetermined voltage value, replacing the second voltage stored in the device with the computed average value and going to Step f; if difference between the two values is not smaller than the second predetermined voltage value and the later is greater, going to (3) subsequently; if difference between the two values is not smaller than the second predetermined voltage value and the former is greater, going to (4);

(3), determining whether the third voltage is collected, if yes, replacing the third voltage stored in the device with the first voltage stored in the device and replacing the first voltage stored in the device with the second voltage stored in the device and replacing the second voltage stored in the device with the computed average value and going to Step f; otherwise, storing the first voltage stored in the device as the third voltage and replacing the first voltage stored in the device with the second voltage stored in the device and replacing the second voltage stored in the device with the computed average value and going to Step f; and (4), determining whether the third voltage is collected, if yes, replacing the third voltage stored in the device with the first voltage stored in the device and replacing the first voltage stored in the device with the computed average value and going to Step f; otherwise, storing the first voltage stored in the device as the third voltage and replacing the first voltage stored in the device with the computed average value and going to Step f;

the setting voltage according to a second predetermined rule includes:

(1), determining whether the third voltage is collected, if yes, going to (2); otherwise storing the computed average value as the third voltage and going to Step f;

(2), comparing the computed average value with the third voltage stored in the device, if difference between the two values is smaller than the second predetermined voltage value, replacing the third voltage stored in the device with the computed average value; if difference between the two values is not smaller than the second predetermined voltage value and the later is greater, going to (3) subsequently; if difference between the two values is not smaller than the second predetermined voltage value and the former is greater, going to (4);

(3), determining whether the second voltage is collected, if yes, replacing the second voltage stored in the device with the first voltage stored in the device and replacing the first voltage stored in the device with the computed average value and going to Step f; otherwise, storing the first voltage stored in the device as the second voltage and replacing the first voltage stored in the device with the computed average value and going to Step f; and (4), determining whether the second voltage is collected, if yes, replacing the second voltage stored in the device with the first voltage stored in the device and replacing the first voltage stored in the device with the third voltage stored in the device and replacing the third voltage stored in the device with the computed average value and going to Step f; otherwise, storing the first voltage stored in the device as the second voltage and replacing the first voltage stored in the device with the third voltage stored in the device and replacing the third voltage stored in the device with the computed average value and going to Step f;

and the predetermined requirement is that both difference between the third voltage stored in the device and the first voltage stored in the device and difference between the first voltage stored in the device and the second voltage stored in the device are greater than a third predetermined voltage value.

In case that the device stores the first voltage, the second voltage and the third voltage in a high-to-low voltage value order of the first voltage, the second voltage and the third voltage, correspondingly, the setting voltage according to the first predetermined rule includes:

(1), determining whether the second voltage is collected, if yes, going to (2); otherwise, storing the computed average value as the second voltage and going to Step f;

(2), comparing the computed average value with the second voltage stored in the device, if difference between the two values is smaller than the second predetermined voltage value, replacing the second voltage stored in the device with the computed average value; if difference between the two values is not smaller than the second voltage value and the later is greater, going to (3) subsequently; if difference between the two values is not smaller than the second predetermined voltage value and the former is greater, going to (4);

(3), determining whether the third voltage is collected, if yes, replacing the third voltage stored in the device with the computed average value, going to Step f; otherwise, storing the computed average value as the third voltage and going to Step f; and (4), determining whether the third voltage is collected, if yes, replacing the third voltage stored in the device with the second voltage stored in the device and replacing the second voltage stored in the device with the computed average value and going to Step f; otherwise, storing the second voltage stored in the device as the third voltage and replacing the second voltage stored in the device with the computed average value and going to Step f;

the setting voltage according to a second predetermined rule includes:

(1), determining whether the second voltage is collected, if yes, going to (2); otherwise, storing the first voltage stored in the device as the second voltage and replacing the first voltage stored in the device with the computed average value and going to Step f; and (2), determining whether the third voltage is collected, if yes, replacing the third voltage stored in the device with the second voltage stored in the device, replacing the second voltage stored in the device with the first voltage stored in the device, replacing the first voltage stored in the device with the computed average value and going to Step f; otherwise, storing the second voltage stored in the device as the third voltage, replacing the second voltage stored in the device with the first voltage stored in the device, replacing the first voltage stored in the device with the computed average value and going to Step f;

and the predetermined requirement is that both difference between the first voltage stored in the device and the second voltage stored in the device and difference between the second voltage stored in the device and the third voltage stored in the device are greater than a third predetermined voltage value.

The device is configured with a partial self-adaptability flag and the partial self-adaptability flag is checked for in case of a successful self-adaptability;

if the partial self-adaptability is not set, the method includes:

(1), collecting voltage value, if the device stores the last collected voltage value, going to (2); otherwise, going to (3);

(2), comparing the currently collected voltage value with the last collected voltage value, if difference between the two values is smaller than the first predetermined voltage value, going to (3); otherwise, replacing the last collected voltage value with the currently collected voltage value, clearing the voltage value buffer, quitting and waiting for next entering;

(3), adding the currently collected voltage value to the voltage value buffer and determining whether number of voltage values stored in the voltage value buffer reaches the first predetermined value, if yes, going to (4); otherwise, quitting and waiting for next entering;

(4), computing the average value of all voltage values stored in the voltage value buffer and determining whether the first voltage is collected, if yes, going to (5); otherwise, storing the computed average value as the first voltage and going to (6);

(5), comparing the computed average value with the first voltage stored in the device, if difference between the two values is smaller than the second predetermined voltage value, replacing the first voltage stored in the device with the computed average value and going to (6); if difference between the two values is not smaller than the second predetermined voltage value and the later is greater, setting voltage according to the first predetermined rule and going to (6); if difference between the two values is not smaller than the second predetermined voltage value and the former is greater, setting voltage according to the second predetermined rule and going to (6);

(6), determining whether the first voltage, the second voltage and the third voltage are all collected, if yes, going to (7); otherwise, quitting and waiting for next entering;

(7), determining whether the first voltage, the second voltage and the third voltage stored in the device are all satisfied with the predetermined requirement, if yes, setting the partial self-adaptability flag, setting a time-out of the partial self-adaptability, quitting and the device waiting for receiving data; otherwise, going to (8); wherein the predetermined requirement is that among the first voltage, the second voltage and the third voltage, difference between the middle-valued voltage and the smallest-valued voltage and difference between the largest-valued voltage and the middle-valued voltage are all greater than a third predetermined voltage value; and (8), determining whether the predetermined resistor-switching condition is satisfied with, if yes, checking for status of the current load resistor, switching into the next load resistor according to the predetermined rule, quitting, waiting for next entering and collecting voltage according to the next load resistor; otherwise, the self-adaptability being failed, quitting; wherein the predetermined resistor switching, condition is that times of switching the resistor does not reach the second predetermined value;

if the partial self-adaptability is set, the method includes:

(1), determining whether time-out of the partial self-adaptability is exceeded, if yes, the self-adaptability being failed and quitting; otherwise, collecting voltage value, and if the device stores the last collected voltage value, going to (2); otherwise, going to (3);

(2), comparing the currently collected voltage value with the last connected voltage value, if difference between the two values is smaller than the first predetermined voltage value, going to (3); otherwise, replacing the last collected voltage value with the currently collected voltage value, clearing the voltage value buffer and going to (3);

(3), adding the currently collected voltage value to the voltage value buffer and determining whether number of voltage values stored in the voltage value buffer reaches the third predetermined value, if yes, going to (4); otherwise, quitting and waiting for next entering;

(4), computing the average value of all voltage values stored in the voltage value buffer, comparing the computed average value with the first voltage stored in the device, if difference between the two values is smaller than the second predetermined voltage value, replacing the first voltage stored in the device with the computed average value and going to (7); otherwise, going to (5);

(5), comparing the computed average value with the second voltage stored in the device, if difference between the two values is smaller than the second predetermined voltage value, replacing the second voltage stored in the device with the computed average value and going to (7), otherwise, going to (6);

(6), comparing the computed average value with the third voltage stored in the device, if difference between the two values is smaller than the second predetermined voltage to value, replacing the third voltage stored in the device with the computed average value and going to (7); otherwise, discarding the computed average value, quitting and waiting for next entering;

(7), determining whether the first voltage, the second voltage and the third voltage are all collected, if yes, going to (8); otherwise, quitting and waiting for next entering;

(8), determining whether the first voltage, the second voltage and the third voltage stored in the device are all satisfied with the predetermined requirement, if yes, quitting and the device waiting for receiving data; otherwise, going to (9); wherein the predetermined requirement is that among the first voltage, second voltage and third voltage stored in the device, difference between the middle-valued voltage and the smallest-valued voltage and difference between the largest-valued voltage and the middle-valued voltage are both greater than a third predetermined voltage value; and (9), determining whether the predetermined condition of switching resistor is satisfied with, if yes, checking for status of the current load resistor, switching into next load resistor according to the predetermined rule, quitting and waiting for next entering; otherwise, the self-adaptability being failed and quitting; in which the predetermined condition of switching resistor is that times of switching resistor does not reach a fourth predetermined value.

The device is configured with a flag of precisely collecting gray voltage, and if the self-adaptability is not failed, the method includes checking for the flag of precisely collecting gray voltage;

if the flag of precisely collecting gray voltage is not set, the method includes:

(1), collecting voltage value and if the device stores the last collected voltage value, going to (2); otherwise, going to (3);

(2), comparing the currently collected voltage value with the last collected voltage value, if difference between the two values is smaller than the first predetermined voltage value, going to (3); otherwise, replacing the last collected voltage value with the currently collected voltage value, clearing the voltage value buffer and going to (3);

(3), storing the currently collected voltage value in the voltage value buffer and determining whether number of voltage values stored in the voltage value buffer reaches the first predetermined value, if yes, going to (4); otherwise, quitting and waiting for next entering;

(4), computing the average value of all voltage values stored in the voltage value buffer and determining whether the first voltage is collected, if yes, going to (5); otherwise, storing the computed average value as the first voltage and going to (6);

(5), comparing the computed average value with the first voltage stored in the device, if difference between the two values is smaller than the second predetermined voltage value, replacing the first voltage stored in the device with the computed average value and going to (6); if difference between the two values is not smaller than the second predetermined voltage value and the later is greater, setting voltage according to the first predetermined rule and going to (6); if difference between the two values is not smaller than the second predetermined voltage value and the former is greater, setting voltage according to the second predetermined rule and going to (6);

(6), determining whether the first voltage, the second voltage and the third voltage are all collected, if yes, going to (7); otherwise, quitting and waiting for next entering;

(7), determining whether the first voltage, the second voltage and the third voltage stored in the device are all satisfied with the predetermined requirement, if yes, setting the flag of precisely collecting gray voltage, setting time-out of precisely collecting gray voltage, quitting and waiting for next entering; otherwise, going to (8); wherein the predetermined requirement is that among the first voltage, second voltage and third voltage stored in the device, difference between the middle-valued voltage and the smallest-valued voltage and difference between the largest-valued voltage and the middle-valued voltage are both greater than a third predetermined voltage value; and (8), determining whether the predetermined condition of switching resistor is satisfied with, if yes, checking for status of the current load resistor, switching into next load resistor according to the predetermined rule, quitting, waiting for next entering and collecting voltage according to the next load resistor; otherwise, the self-adaptability being failed and quitting; wherein the predetermined condition of switching resistor is that times of switching resistor does not reach the second predetermined value;

if the flag of precisely collecting gray voltage is set, the method includes:

(1), determining whether time-out of precisely collecting gray voltage is reached, if yes, the self-adaptability being failed and quitting; otherwise, going to (2);

(2), collecting voltage value and determining whether difference between the currently collected voltage value and a predetermined voltage stored in the device is smaller than a fourth predetermined voltage value, if yes, going to (3); otherwise, quitting and waiting for next entering; wherein the predetermined voltage stored in the device is the middle-valued voltage among the first voltage, the second voltage and the third voltage stored in the device;

(3), if the device stores the last collected voltage value, going to (4); otherwise, going to (5);

(4), comparing the currently collected voltage value with the last collected voltage value, if difference between the two values is smaller than the first predetermined voltage value, going to (5); otherwise, replacing the voltage value last collected by the device with the currently collected voltage value, clearing the voltage value buffer and going to (5);

(5), storing the currently collected voltage value in the voltage value buffer and determining, whether number of voltage values stored in the voltage value buffer reaches a fifth predetermined value, if yes, going to (6); otherwise, quitting and waiting for next entering; and (6), computing the average value of all voltage values stored in the voltage value buffer, replacing predetermined voltage stored in the device with the computed average value, resetting the flag of precisely collecting gray voltage and quitting, the device waiting for receiving data.

The device sets a partial self-adaptability flag and a flag of precisely collecting gray voltage and in case that the self-adaptability is not failed, the method includes checking for the flag of precisely collecting gray voltage, if the flag of precisely collecting gray voltage is set, the method includes:

(1), determining whether time-out of precisely collecting gray voltage is reached, if yes, the self-adaptability being failed and quitting; otherwise, going to (2);

(2), collecting voltage value and determining whether difference between the currently collected voltage value and the predetermined voltage stored in the device is smaller than a fourth predetermined voltage value, if yes, going to (3); otherwise, quitting and waiting for next entering, wherein the predetermined voltage stored in the device is a middle-value voltage among the first voltage, the second voltage and the third voltage stored in the device;

(3), if the device stores the last collected voltage value, going to (4); otherwise, going to (5);

(4), comparing the currently collected voltage value with the last collected voltage value, if difference between the two values is smaller than the first predetermined voltage value, going to (5); otherwise, replacing the last collected voltage value with the currently collected voltage value, clearing the voltage value buffer and going to (5);

(5), storing the currently collected voltage value in the voltage value buffer and determining whether number of voltage values stored in the voltage value buffer reaches a fifth predetermined value, if yes, going to (6); otherwise, quitting and waiting for next entering; and (6), computing the average value of all voltage values stored in the voltage value buffer, replacing the predetermined voltage stored in the device with the computed average value, resetting the flag of precisely collecting gray voltage and quitting, the device waiting for receiving data;

in case that the flag of precisely collecting gray voltage is not set, the method includes checking for the part self-adaptability flag, in case that the flag of precisely collecting gray voltage is set, the method includes:

(1), determining whether time-out of the partial self-adaptability is reached, if yes, the self-adaptability being failed, quitting and waiting for next entering; otherwise, collecting voltage value and if the device stores the last collected voltage value, going to (2); otherwise, going to (3);

(2), comparing the currently collected voltage value with the last collected voltage value, if difference between the two values is smaller than the first predetermined voltage value, going to (3); otherwise, replacing the last collected voltage value with the currently collected voltage value, clearing the voltage value buffer and going to (3);

(3), storing the currently collected voltage value in the voltage value buffer and determining whether number of voltage values stored in the voltage value buffer reaches the third predetermined value, if yes, going to (4); otherwise, quitting and waiting for next entering;

(4), computing the average value of all voltage values stored in the voltage value buffer, comparing the computed average value with the first voltage stored in the device, if difference between the two values is smaller than the second predetermined voltage value, replacing the first voltage stored in the device with the computed average value and going to (7); otherwise, going to (5);

(5), comparing the computed average value with the second voltage stored in the device, if difference between the two values is smaller than the second predetermined voltage value, replacing the second voltage stored in the device with the computed average value and going to (7); otherwise, going to (6);

(6), comparing the computed average value with the third voltage stored in the device, if difference between the two values is smaller than the second predetermined voltage value, replacing the third voltage stored in the device with the computed average value and going to (7); otherwise, discarding the computed average value, quitting and waiting for next entering;

(7), determining whether the first voltage, second voltage and third voltage is all collected, if yes, going to (8); otherwise, quitting and waiting for next entering;

(8), determining whether the first voltage, the second voltage and the third voltage stored in the device are all satisfied with the predetermined requirement, if yes, quitting and waiting for next entering; otherwise, going to (9); and (9), determining whether the predetermined condition of switching resistor is satisfied with, if yes, checking for status of the current load resistor, switching into next load resistor according to the predetermined rule, quitting and waiting for next entering; otherwise, setting the self-adaptability failure flag and quitting; wherein the predetermined resistor switching condition is that times of switching resistor does not reach a fourth predetermined value;

in case that the part self-adaptability flag is not set, the method includes:

(1) collecting voltage value and if the device stores the last collected voltage value, going to (2); otherwise, going to (3);

(2), comparing the currently collected voltage value with the last collected voltage value, if difference between the two values is smaller than the first predetermined voltage value, going to (3); otherwise, replacing the last collected voltage value with the currently collected voltage value, clearing the voltage value buffer, quitting and waiting for next entering;

(3), storing the currently collected voltage value in the voltage value buffer and determining whether number of voltage values stored in the voltage value buffer reaches the first predetermined value, if yes, going to (4); otherwise, quitting and waiting for next entering;

(4), computing the average value of all voltage values stored in the voltage value buffer and determining whether the first voltage is collected, if yes, going to (5); otherwise, storing the computed average value as the first voltage and going to (6);

(5), comparing the computed average value with the first voltage stored in the device and if difference between the two values is smaller than the second predetermined voltage value, replacing the first voltage value stored in the device with the computed average value and going to (6); if difference between the two values is not smaller than the second predetermined voltage value and the later is greater, setting voltage according to the first predetermined rule and going to (6); if difference between the two values is not smaller than the second predetermined voltage value and the former is greater, setting voltage according to the second predetermined rule and going to (6);

(6), determining whether the first voltage, the second voltage and the third voltage are all collected, if yes, going to (7); otherwise, quitting and waiting for next entering;

(7), determining whether the first voltage, the second voltage and the third voltage are all satisfied with the predetermined requirement, if yes, setting the partial self-adaptability flag and the flag of precisely collecting gray voltage, setting the time-out of the part self-adaptability and the time-out of the precisely collecting gray voltage and quitting, the device waiting for receiving data; otherwise, going to (8); wherein the predetermined requirement is that among the first voltage, second voltage and third voltage, difference between the middle-valued voltage and the smallest-valued voltage and difference between the largest-valued voltage and the middle-valued voltage is both greater than a third predetermined voltage value; and (8), determining whether the predetermined condition of switching resistor is satisfied with, if yes, checking for status of the current load resistor, switching into next load resistor according to the predetermined rule, quitting and waiting for next entering and collecting voltage according to the next load resistor; otherwise, the self-adaptability being failed and quitting; wherein the predetermined condition of switching resistor is that times of switching resistor does not reach the second predetermined value.

The predetermined condition is detecting timer interruption, in which the timer interruption is started when the device receives a self-adaptability request and is closed when the self-adaptability is completed or is failed, or when precise collection of gray voltage is completed.

The device is deployed with five-level load resistors which are identified as HH, H, M, L and LL in order of high-to-low resistance;

the device controls conducting the load resistor M upon receiving the self-adaptability request;

the predetermined rule is cycle switching, in an order of M-L-LL-H-HH or cycle switching in an order of M-L-H-LL-HH.

The self-adaptability failure flag is configured to determine whether the self-adaptability is failed and if the self-adaptability failure flag is set, the self-adaptability is identified as failure;

a flag of the first voltage having been collected is configured to determine whether the first voltage has been collected and if the flag of the first voltage having been collected is set, the first voltage is identified as having been collected;

a flag of the second voltage having been collected is configured to determine whether the second voltage has been collected and if the flag of the second voltage having been collected is set, the second voltage is identified as having been collected;

a flag of the third voltage having been collected is configured to determine whether the third voltage has been collected and if the flag of the third voltage having been collected is set, the third voltage is identified as having been collected;

The invention has advantages of improving luminous intensity adaptability of a screen and reducing rate of error codes when collecting optical signal.

BRIEF DESCRIPTION OF THE DRAWINGS

For clarifying the embodiments of the invention or technical solution of prior art, a simple description will be taken of the drawings used in the embodiments and the prior art as below. Obviously, the below-mentioned drawings are just examples of the invention. A common person skill in the art will obtain other drawings according to the provided drawings without involving an inventive effort.

FIGS. 1-4, 5-a, 5-b, 6-a, 6-b and 7 are flow charts of a method for improving luminous intensity adaptability provided by Embodiment 1 of the invention;

FIGS. 8-a to 8-d are flow charts of a complete self-adaptability method provided by Embodiment 2 of the invention;

FIGS. 9-a and 9-b are flow charts of a complete self-adaptability method provided by Embodiment 3 of the invention;

FIGS. 10-a and 10-b are flow charts of a complete self-adaptability method provided by Embodiment 4 of the invention;

FIGS. 11-a and 11-b are flow charst of a partial self-adaptability method provided by Embodiment 5 of the invention;

DETAILED DESCRIPTION OF THE INVENTION

A clear and complete description will be taken of the solution of embodiments of the invention in conjunction with drawings of embodiments of the invention. Obviously, the described embodiments are just part of embodiments of the invention, not the whole embodiments. Based on embodiments of the invention, all other embodiments obtained by a person skill in the art without involving an inventive effort should fall within the scope of protection of the invention.

Embodiment 1

Figure 1:
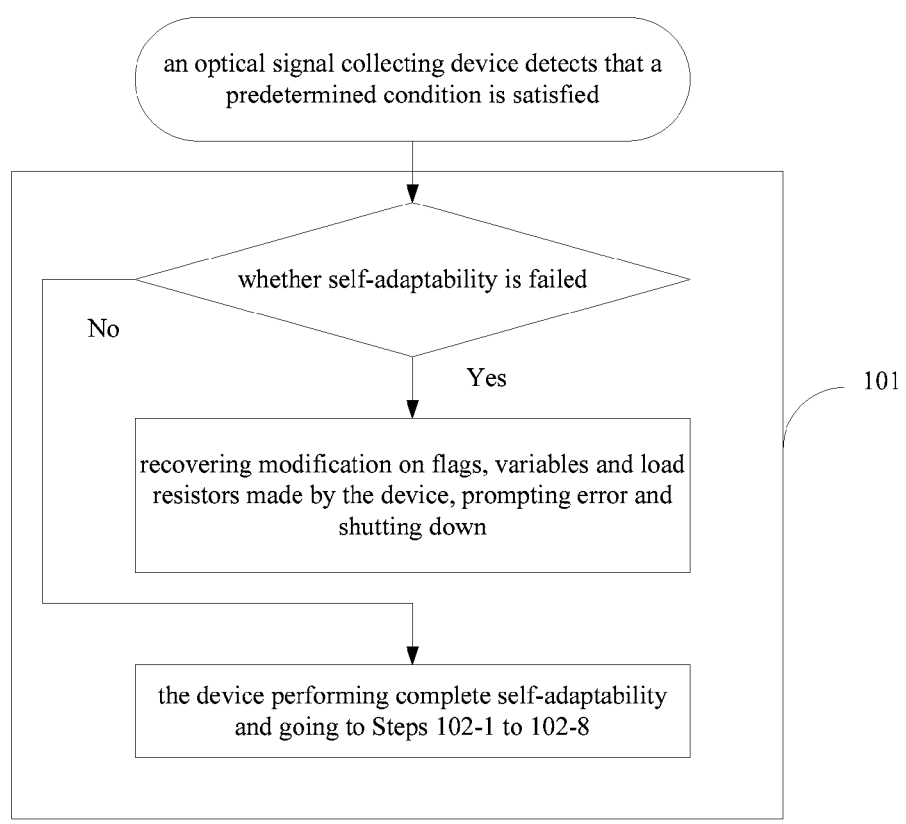

In order to improve luminous intensity adaptability of an optical signal collecting device during collecting optical signal, a method for improving luminous intensity adaptability of a screen during collecting optical signal is provided according to the embodiment of the invention. In the method, the device controls a predetermined load resistor to conduct upon receiving a self-adaptability request, as shown in FIG. 1, and the following steps are executed each time the device detects that a predetermined condition is satisfied with.

Step 101, determining whether self-adaptability is failed, if yes, restoring modifications on flags, variables and load resistors made by the device, prompting error and shutting down the device; otherwise, the device performing complete self-adaptability of the device, specifically the complete self-adaptability being executed in Steps 102-1 to 102-8.

Figure 2:
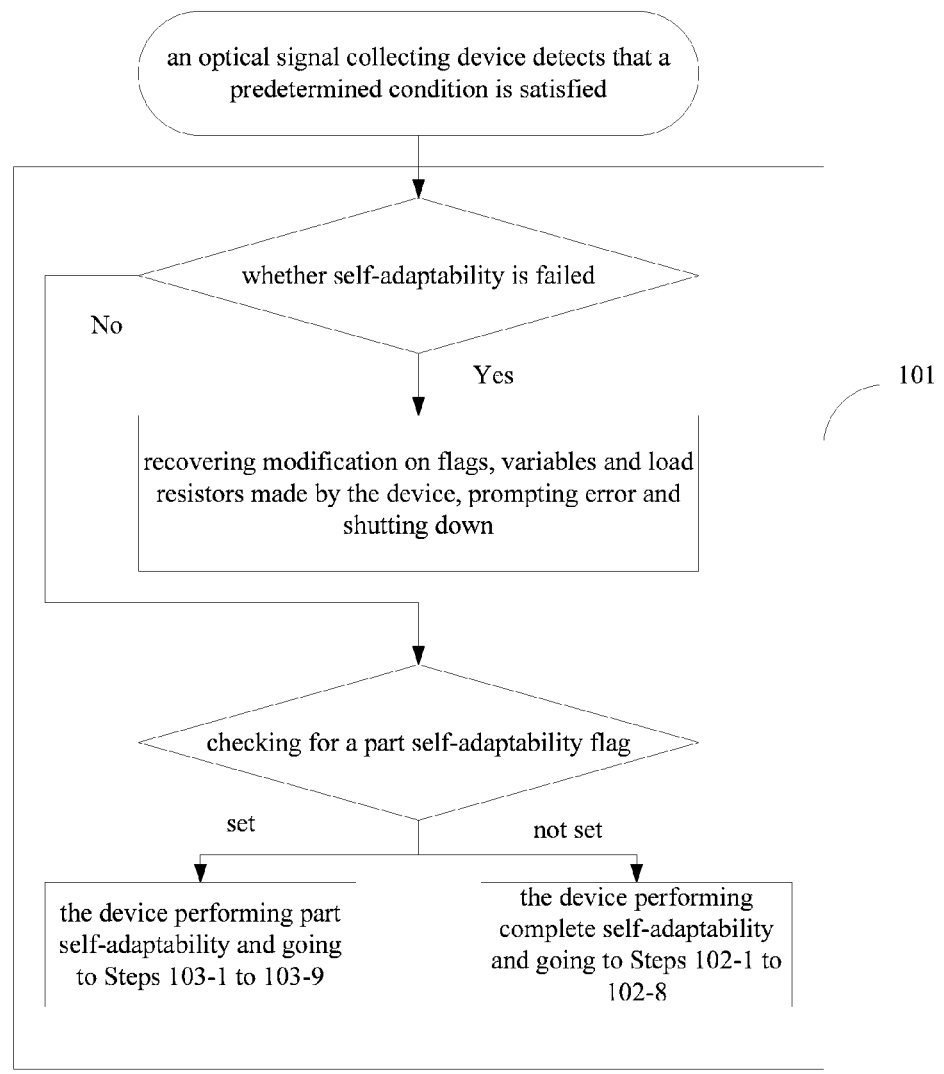
Figure 3:
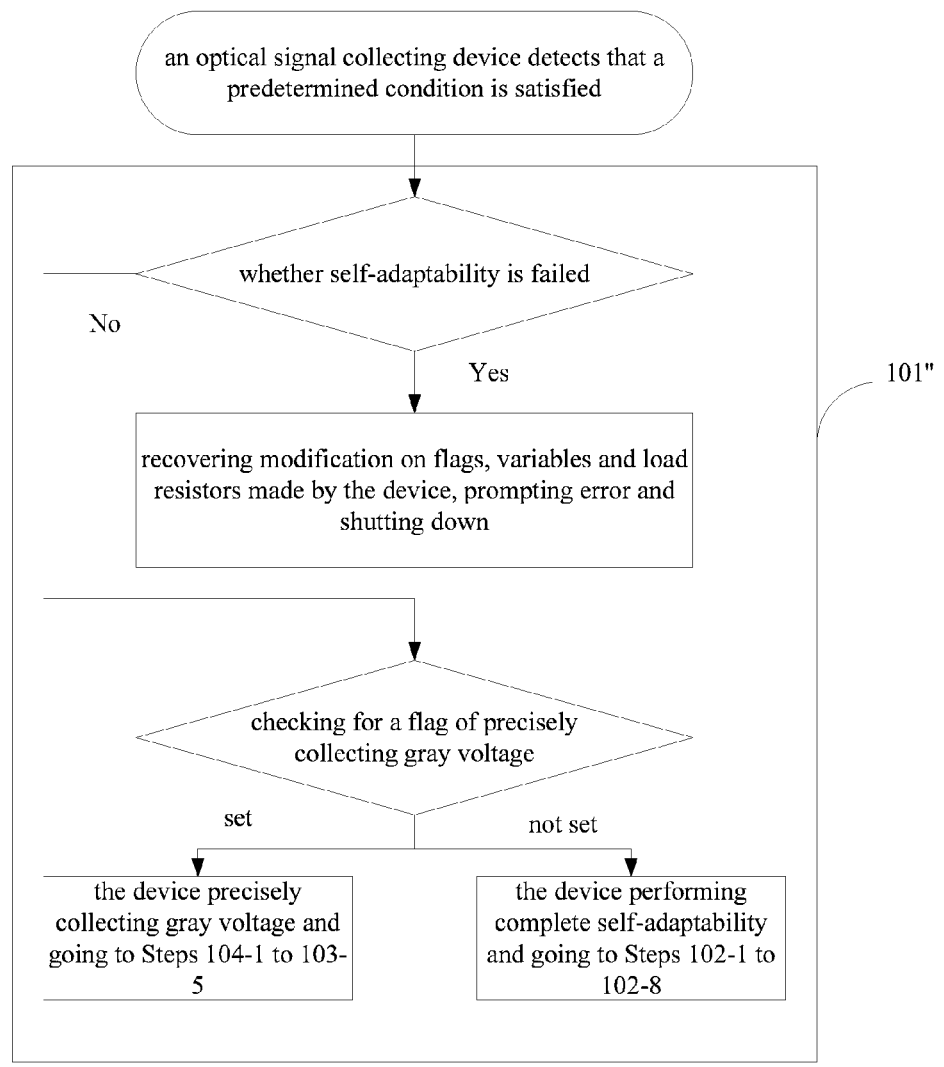
Figure 4:
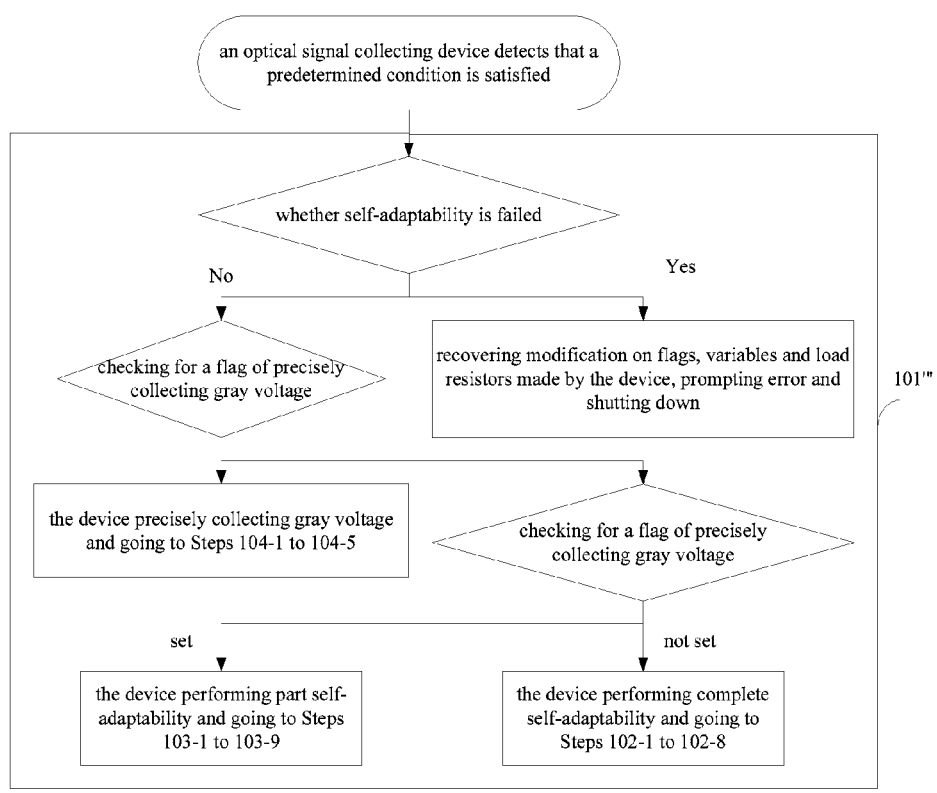

As shown in FIGS. 2 to 4, Step 101 can be replaced with Step 101' or Step 101" or Step 101'''.

Step 101', determining whether self-adaptability is failed, if yes, restoring modifications on flags, variables and load resistors made by the device and prompting error and shutting down device; otherwise, checking for partial self-adaptability flag, if the partial self-adaptability flag is set, performing partial self-adaptability by executing Steps 103-1 to 103-9; if the flag is not set, performing complete self-adaptability by executing. Steps 102-1 to 102-8.

It is noted that Step 102-7 can be replaced with Step 102-7' which includes determining whether first voltage, second voltage and third voltage stored in the device are satisfied with predetermined requirement, if yes, setting time-out of the partial self-adaptability flag and quitting; and the device waiting for receiving data otherwise executing Step 102-8.

Step 101", determining whether self-adaptability is failed, if yes, restoring modifications on flags, variables and load resistors made by the device, prompting error and shutting down the device; otherwise checking for a flag of precisely collecting gray voltage, if the flag is set, precisely collecting the gray voltage by executing Steps 104-1 to 104-6; if the flag is not set, the device performing complete self-adaptability by executing Steps 102-1 to 102-8.

It is noted that Step 102-7 can be replaced with Step 102-7" which includes determining whether first voltage, second voltage and third voltage stored in the device are satisfied with predetermined requirement, if yes, setting the flag of precisely collecting gray voltage and setting time-out of the precisely collecting gray voltage, quitting and the device waiting for receiving data; otherwise executing Step 102-8.

Step 101''', determining, whether self-adaptability is failed, if yes, restoring, modifications on flags, variables and load resistors made by the device, prompting error and shutting down the device; otherwise, checking for the flag of precisely collecting gray voltage, if the flag is set, the device performing precisely collecting gray voltage by executing Steps 104-1 to 104-6; if the flag is not set, checking whether the partial self-adaptability flag is set, and if yes, the device performing partial self-adaptability by executing Steps 103-1 to 103-9; otherwise, the device performing complete self-adaptability by executing Steps 102-1 to 102-8.

It is noted that Step 103-8 can be replaced with Step 103-8' and Step 102-7 can be replaced with Step 102-7'''.

Step 103-8', determining whether the first voltage, the second voltage and the third voltage stored in the device are satisfied with predetermined requirement, if yes, quitting and waiting for next entering; otherwise, executing Step 103-9.

Step 102-7''', determining whether the first voltage, the second voltage and the third voltage stored in the device are satisfied with predetermined requirement, if yes, setting the partial self-adaptability flag and the flag of precisely collecting gray voltage, setting time-out of the partial self-adaptability and time-out of the precisely collecting gay voltage and quitting, the device waiting for receiving data otherwise executing Step 102-8.

As shown in FIGS. 5-a and 5-b, Steps 102-1 to 102-8 include following steps.

Step 102-1, collecting voltage value and determining whether a last collected voltage value is stored in the device, if yes, going to Step 102-2; otherwise, going to Step 102-3.

Step 102-2, comparing the currently collected voltage value with the last collected voltage value, if difference between the two values is smaller than a first predetermined voltage value, going to Step 102-3; otherwise, replacing the last collected voltage value with the currently collected voltage value, clearing a voltage value buffer and going to Step 102-3.

Step 102-3, storing the currently collected voltage value into the voltage value buffer and determining whether number of voltage values stored in the voltage value buffer reaches a first predetermined value, if yes, going to Step 102-4; otherwise, quitting and waiting for next entering.

Step 102-4, computing an average value of all voltage values stored in the voltage value buffer and determining whether the first voltage is collected, if yes, going to Step 102-5; otherwise, storing the computed average value as first voltage and going to Step 102-6.

Step 102-5, comparing the computed average value with the first voltage stored in the device, if difference between the two values is smaller than a second predetermined voltage value, replacing the first voltage stored in the device with the computed average value and going to Step 102-6; if difference between the two values is not smaller than the second predetermined voltage value and the later is greater, setting voltage according to a first predetermined rule and going to Step 102-6; if difference between the two values is not smaller than the second predetermined voltage value and the former is greater, setting voltage according to a second predetermined rule and going to Step 102-6.

Step 102-6, determining whether all of first voltage, second voltage and third voltage are collected, if yes, going to Step 102-7; otherwise, quitting and waiting for the next entering.

Step 102-7, determining whether first voltage, second voltage and third voltage stored in the device are satisfied with predetermined requirement, if yes, quitting and the device waiting for receiving data; otherwise, going to Step 102-8.

Step 102-8, determining whether a predetermined resistor-switching condition is reached, if yes, checking for status of a current load resistor, switching into a next load resistor according to a predetermined rule, quitting and waiting for next entering and collecting voltage according to the next load resistor; otherwise, considering that the self-adaptability is failed, clearing the first voltage, second voltage, and third voltage stored in the device and quitting.

As shown in FIGS. 6-a and 6-b, Steps 103-1 to 103-9 include the following steps.

Step 103-1, determining whether the time-out of the partial self-adaptability is reached, if yes, considering that the self-adaptability is failed and quitting; otherwise, collecting voltage value and determining whether the last collected voltage value is stored in the device, if yes, going; to Step 103-2; otherwise, directly going to Step 103-3.

Step 103-2, comparing the currently collected voltage value with the last collected voltage value, if difference between the two values is smaller than the first predetermined voltage value, going to Step 103-3; otherwise, replacing the last collected voltage value with the currently collected voltage value, clearing the voltage value buffer and going to Step 103-3.

Step 103-3, storing the currently collected voltage value into the voltage value buffer and determining whether number of voltage values stored in the voltage value buffer reaches the first predetermined value, if yes, going to Step 103-4; otherwise, quitting and waiting for next entering.

Step 103-4, computing an average value of all voltage values stored in the voltage value buffer and comparing the computed average value with the first voltage stored in the device, if difference between the two values is smaller than the second predetermined voltage value, replacing the first voltage stored in the device with the computed average value and going to Step 103-7; otherwise going to Step 103-5.

Step 103-5, comparing the computed average value with the second voltage stored in the device, if difference between the two values is smaller than the second predetermined voltage value, replacing the second voltage stored in the device with the computed average value and going to Step 103-7; otherwise, going to Step 103-6.

Step 103-6, comparing the computed average value with a third voltage stored in the device, if difference between the two values is smaller than the second predetermined voltage value, replacing the third voltage stored in the device with the computed average value and going to Step 103-7; otherwise discarding the computed average value, quitting and waiting for next entering.

Step 103-7, determining whether all of the first voltage, second voltage and third voltage are collected, if yes, going to Step 103-8; otherwise quitting and waiting for next entering.

Step 103-8, determining whether the first voltage, second voltage and third voltage stored in the device are satisfied with predetermined requirement, if yes, quitting and the device waiting for receiving data; otherwise, going to Step 103-9.

Step 103-9, determining whether the predetermined resistor switching condition is satisfied with, if yes, checking for status of the current load resistor, switching into a next load resistor according to a predetermined rule, quitting and waiting for next entering and collecting voltage according to the next load resistor; otherwise determining that the self-adaptability is failed and quitting.

Figure 7:
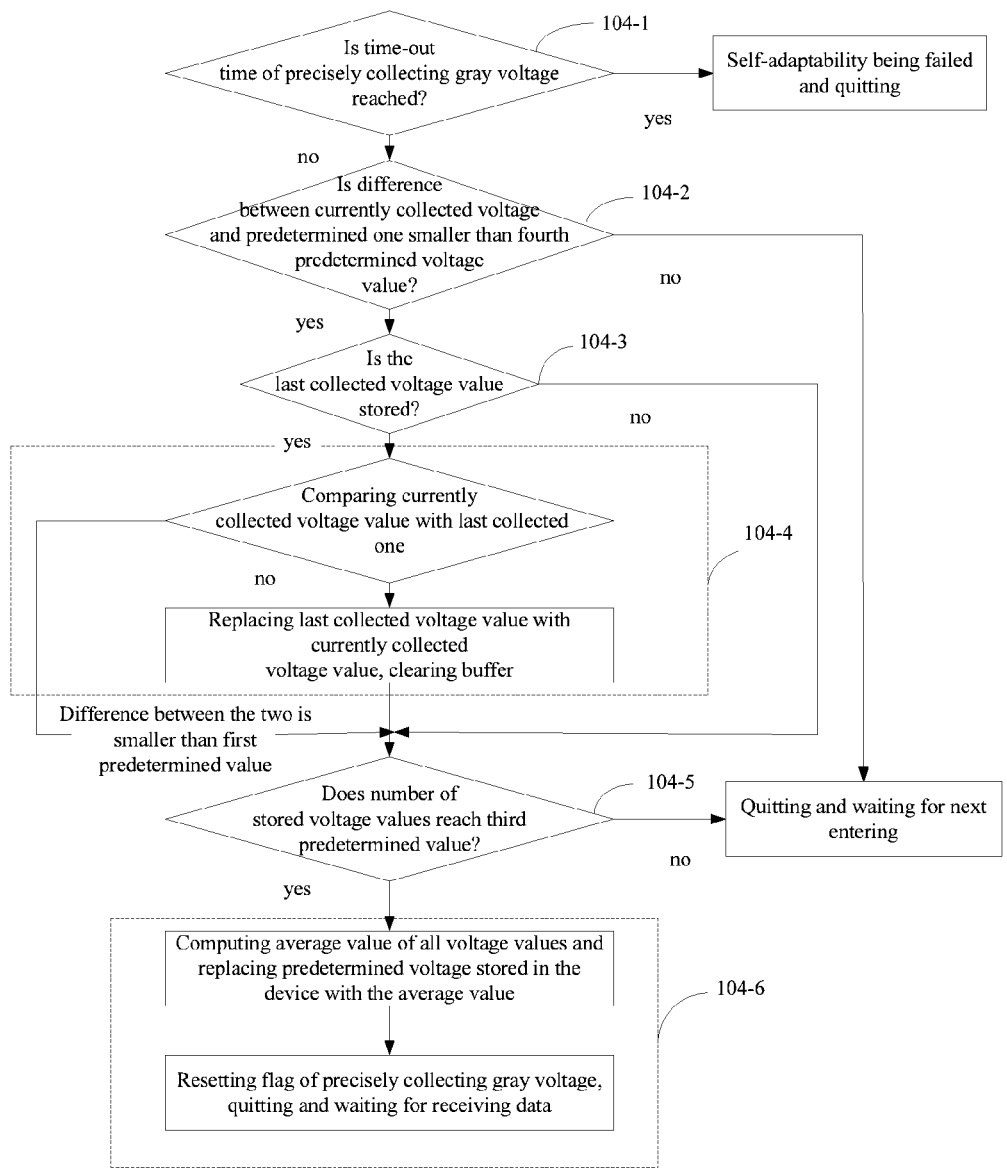

As shown in FIG. 7, Steps 104-1 to 104-5 include the following steps.

Step 104-1, determining whether the time-out of the precisely collecting gray voltage is reached, if yes, considering that the self-adaptability is failed and quitting; otherwise going to Step 104-2.

Step 104-2, collecting a voltage value and determining whether difference between the currently collected voltage value and predetermined voltage stored in the device is smaller than a fourth predetermined voltage value, if yes, going to Step 104-3; otherwise, quitting and waiting for next entering.

The predetermined voltage stored in the device is middle-valued voltage among the first voltage, the second voltage and the third voltage stored in the device.

Step 104-3, determining whether the last collected voltage value is stored in the device, if yes, going to Step 104-4 otherwise, going to Step 104-5 directly.

Step 104-4, comparing the currently collected voltage value with the last collected voltage value, if difference between the two values is smaller than the first predetermined voltage value, going to Step 104-5; otherwise, replacing the last collected voltage value with the currently collected voltage value, clearing the voltage value buffer and going to Step 104-5.

Step 104-5, storing the currently collected voltage value into the voltage value buffer and determining whether number of voltage values stored in the voltage value buffer reaches a third predetermined value, if yes, going to Step 104-6; otherwise, quitting and waiting for next entering.

Step 104-6, computing an average value of all voltage values stored in the voltage value buffer, replacing the predetermined voltage stored in the device with the computed average value, setting the flag of precisely collecting gray voltage and quitting, and the device waiting for receiving data.

Preferably in the embodiment:

the predetermined condition can be, but not limited to, the time when a timer interruption is detected;

the self-adaptability failure flag identifies whether self-adaptability is failed and the flag being set identifies a failed self-adaptability; a flag of the first voltage having been collected identifies whether the first voltage has been collected and the flag being set identifies that the first voltage has been collected; a flag of the second voltage having been collected identifies whether the second voltage has been collected and the flag being set identifies that the second voltage has been collected; a flag of the third voltage having been collected identifies whether the third voltage has been collected and the flag being set identifies that the third voltage has been collected; and obviously, other methods can be used to identify and details of them are omitted; and five-level load resistors are deployed in the device, which are identified as HH, H, M, L and LL in order of high-to-low resistance; the device conducts load resistor M upon receiving a self-adaptability request; the predetermined rule includes cycle switching in an order of M-L-LL-H-HH or cycle switching in an order of M-L-H-LL-HH; more load resistors can be deployed in the device, and the initially conducting load resistor and switching order can be set with the same method.

Embodiment 2

As shown in FIGS. 8-a, 8-b, 8-c, and 8-d, the embodiment of the invention provides a complete self-adaptability method performed by a device. The method includes the following steps.

Step 201, collecting a voltage value and determining whether a last collected voltage value is stored in the device, if yes, going to Step 202 subsequently; otherwise storing a currently collected voltage value as the last collected voltage value and going to Step 204.

Specifically in the embodiment, the step of collecting a voltage value includes that the device converts signal collected from its screen into electrical signal via a sensor and converts the electrical signal into a digital value, namely a voltage value, via an AD converter.

Step 202, determining whether difference between the currently collected voltage value and the last collected voltage value stored in the device is smaller than a predetermined voltage value, if yes, going to Step 204; otherwise, going to Step 203 subsequently.

Step 203, replacing the last collected voltage value stored in the device with the currently collected voltage value, clearing a voltage value buffer and quitting the self-adaptability function.

Step 204, storing the currently collected voltage value in the voltage value buffer.

Step 205, determining whether number of voltage values stored in the voltage value buffer reaches a predetermined value, if yes, going to Step 206 subsequently; otherwise quitting the self-adaptability function.

Preferably, a variable of times is setup in the device. Besides the step of storing the currently collected voltage value in the voltage value buffer, Step 204 further includes: updating the variable of times as the current variable of times plus 1; besides the step of clearing the voltage value buffer, Step 203 further includes: setting the variable of times to be 0; and the step of determining whether number of the voltage values stored in the voltage value buffer reaches a predetermined value in Step 205 specifically includes: determining whether variable of times is smaller than a predetermined value.

Step 206, computing an average value of all voltage values stored in the voltage value buffer.

Step 207, checking for a flag of black voltage having been collected is set, if yes, going to Step 209; otherwise, going to Step 208 subsequently.

Step 208, storing the computed average value as black voltage and setting the flag of black voltage having been collected and going to Step 228.

Step 209, determining whether difference between the computed average value and the current stored black voltage is smaller than a predetermined voltage value, if yes, going to Step 210 subsequently; otherwise, going to Step 211.

Step 210, replacing the currently stored black voltage with the computed average value and going to Step 228.

Step 211, determining whether the computed average value is greater than the currently stored black voltage, if yes, going to Step 217 otherwise, going to Step 212 subsequently.

Step 212, checking for whether as flag of gray voltage having been collected is set, if yes, going to Step 214; otherwise, going to Step 213 subsequently.

Step 213, storing the currently stored black voltage as the gray voltage, setting the flag of the gray voltage having been collected, replacing the currently stored black voltage with the computed average value and going to Step 228.

Step 214, checking for whether a flag of white voltage having been collected is set, if yes, going to Step 216; otherwise, going to Step 215 subsequently.

Step 215, storing the currently stored gray voltage as white voltage and setting flag of white voltage having been collected, replacing the currently stored gray voltage with the currently stored black voltage, replacing the currently stored black voltage with the computed average value and going to Step 228.

Step 216, replacing the currently stored white voltage with the currently stored gray voltage, replacing the currently stored gray voltage with the currently stored black voltage, replacing the currently stored black voltage with the computed average value and going to Step 228.

Step 217, checking for whether the flag of gray voltage having been collected is set, if yes, going to Step 219; otherwise, going to Step 218 subsequently.

Step 218, storing the computed average value as gray voltage, setting the flag of gray voltage having been collected and going to Step 228.

Step 219, determining whether difference between the computed average value and the currently stored gray voltage is smaller than a predetermined voltage value, if yes, going to Step 220; otherwise, going to Step 221.

Step 220, replacing the currently stored gray voltage with the computed average value and going to Step 228.

Step 221, determining whether the computed average value is greater than the currently stored gray voltage, if yes, going to Step 225; otherwise, going to Step 222 subsequently.

Step 222, checking for whether the flag of white voltage having been collected is set, if yes, going to Step 224; otherwise, going to Step 223 subsequently.

Step 223, storing the currently stored gray voltage as white voltage, setting the flag of white voltage having been collected, replacing the currently stored gray voltage with the computed average value and going to Step 228.

Step 224, replacing the currently stored white voltage with the currently stored gray voltage, replacing the currently stored gray voltage with the computed average value and going to Step 228.

Step 225, checking for whether the flag of white voltage having been collected is set, if yes, going to Step 227; otherwise, going to Step 226 subsequently.

Step 226, storing the computed average value as white voltage, setting the flag white voltage having been collected and going to Step 228.

Step 227, replacing the currently stored white voltage with the computed average value and going to Step 228.

Step 228, determining whether the flag of black voltage having been collected, the flag of gray voltage having been collected and the flag of white voltage having been collected are all set, if yes, going to Step 229 subsequently; otherwise, quitting self-adaptability function.

Step 229, determining whether difference between the currently stored white voltage and the gray voltage, and difference between the gray voltage and the black voltage are both greater than a predetermined voltage value, if yes, quitting the self-adaptability function; otherwise going to Step 230 subsequently.

If the device is deployed with a partial self-adaptability capability, and if the difference between the currently stored white voltage and the gray voltage and difference between the gray voltage and the black voltage are both greater than a predetermined voltage value, then the step further includes: setting the partial self-adaptability flag, resetting a flag of first voltage having been collected, a flag of second voltage having been collected and a flag of third voltage having been collected, and setting time-out of self-adaptability.

If the device has a function of precisely collecting gray voltage, and if difference between the currently stored white voltage and the gray voltage and difference between the gray voltage and the black voltage are both greater than a predetermined voltage value, then the step further includes: setting a flag of precisely collecting gray voltage and setting time-out of the precisely collecting gray voltage.

If the device has both function of partial self-adaptability and function of precisely collecting gray voltage, and if difference between the currently stored white voltage and gray voltage and difference between the gray voltage and black voltage are both greater than a predetermined voltage value, then the step further includes: setting the partial self-adaptability flag and the flag of precisely collecting gray voltage, resetting the flag of the first voltage having been collected, the flag of the second voltage having been collected and the flag of the third voltage having been collected, and setting time-out of the part self-adaptability and time-out of precisely collecting gray voltage.

Step 230, determining whether the maximum collecting time is reached, if yes, going to Step 231 subsequently; otherwise, quitting the self-adaptability function.

Specifically in the embodiment, whether the maximum collecting time is reached is determined by the timer.

Step 231, updating a variable of times of switching resistor and determining whether the updated variable of times of switching resistor is greater than a number of predetermined times, if yes, setting the self-adaptability failure flag and clearing the currently stored black voltage, gray voltage and white voltage, quitting the self-adaptability function; otherwise going to Step 232 subsequently.

Specifically in the embodiment, the step of updating the variable of times of switching the load resistor includes: updating the variable of times of switching the load resistor as the current variable of times of switching the load resistor plus 1.

Step 232, checking for status of the load resistor, switching the load resistor according to a predetermined rule and quitting the self-adaptability function.

Preferably in the embodiment, five-level load resistors are configured in the device, which are identified as HH, M, L and LL in order of high-to-low resistance. When the device is initialized, the load resistor M is set to be conducted, and then a cycle switching in an order of M-L-LL-H-HH or in an order of M-L-H-LL-HH is performed, which is not limited herein.

Embodiment 3

As shown in FIGS. 9-a and 9-b, a complete self-adaptability method performed by a device is provided in the embodiment of the invention. The method includes the following steps.

Steps 301-306 are the same as Steps 201-206 and therefore are omitted herein.

Step 307, checking for whether a flag of white voltage having been collected is set, if yes, going to Step 309; otherwise, going to Step 308 subsequently.

Step 308, storing the computed average value as white voltage, setting the flag of white voltage having been collected and going to Step 328.

Step 309, determining whether difference between the computed average value and the currently stored white voltage is smaller than a predetermined value, if yes, going to Step 310 subsequently; otherwise, going to Step 311.

Step 310, replacing the currently stored white voltage with the computed average value and going to Step 328.

Step 311, determining whether the computed average value is greater than the currently stored white voltage, if yes, going to Step 312 subsequently; otherwise, going to Step 317.

Step 312, checking for whether a flag of gray voltage having been collected is set, if yes, going to Step 314; otherwise, going to Step 313 subsequently.

Step 313, storing the currently stored white voltage as gray voltage, setting the flag of gray voltage having been collected, replacing the currently stored white voltage with the computed average value and going to Step 328.

Step 314 checking for whether a flag of black voltage having been collected is set, if yes, going to Step 316; otherwise, going to Step 315 subsequently.

Step 315, storing the currently stored gray voltage as black voltage, setting the flag of black voltage having been collected, replacing the currently stored gray voltage with the currently stored white voltage, replacing the currently stored white voltage with the computed average value and going to Step 328.

Step 316, replacing the currently stored black voltage with the currently stored gray voltage, replacing the currently stored gray voltage with the currently stored white voltage, replacing the currently white voltage with the computed average value and going to Step 328.

Step 317, checking for whether a flag of gray voltage having been collected is set, if yes, going to Step 319; otherwise, going to Step 318 subsequently.

Step 318, storing the computed average value as gray voltage, setting the flag of the gray voltage having been collected and going to Step 328.

Step 319, determining whether difference between the computed average value and the currently stored gray voltage is smaller than predetermined voltage value, if yes, going to Step 320 subsequently; otherwise, going to Step 321.

Step 320, replacing the currently stored gray voltage with the computed average value and going to Step 328.

Step 321, determining whether the computed average value is greater than the currently stored gray voltage, if yes, going to Step 322 subsequently; otherwise, going to Step 325.

Step 322, checking for whether the flag of black voltage having been collected is set, if yes, going to Step 324, otherwise, going to Step 323 subsequently.

Step 323, storing the currently stored gray voltage as black voltage and setting the flag of the black voltage having been collected, replacing the currently stored gray voltage with the computed average value and going to Step 328.

Step 324, replacing the currently stored black voltage with the currently stored gray voltage, replacing the currently stored gray voltage with the computed average value and going to Step 328.

Step 325, checking for whether the flag of black voltage having been collected is set, if yes, going to Step 327; otherwise, going to Step 326.

Step 326, storing the computed average value as black voltage, setting the flag of the black voltage having been collected and going to step 328.

Step 327, replacing the currently stored black voltage with the computed average value and going to Step 328.

Steps 328-332 are the same as Steps 228-232 and are omitted herein.

Embodiment 4

As shown in FIGS. 10-a and 10-b, a complete self-adaptability method performed by a device is provided in the embodiment of the invention. The method includes the following steps.

Steps 401-406 are the same as Steps 201-206 and therefore are omitted herein.

Step 407, checking for whether a flag of gray voltage having been collected is set, if yes, going to Step 409; otherwise, going to Step 408 subsequently.

Step 408, storing the computed average value as gray voltage, setting a flag of gray voltage having been collected and going to Step 434.

Step 409, determining whether difference between the computed average value and the currently stored gray voltage is smaller than a predetermined voltage value, if yes, going to Step 410 subsequently; otherwise, going to Step 411.

Step 410, replacing the currently stored gray voltage with the computed average value and going to Step 434.

Step 411, determining whether the computed average value is greater than the currently stored gray voltage, if yes, going to Step 423; otherwise, going to Step 412 subsequently.

Step 412, checking for whether the flag of black voltage having been collected is set, if yes, going to Step 414; otherwise, going to Step 413 subsequently.

Step 413, storing the computed average value as black voltage, setting the flag of black voltage having been collected and going to Step 434.

Step 414, determining whether difference between the computed average value and the currently stored black voltage is smaller than a predetermined voltage, if yes, going to Step 415 subsequently; otherwise, going to Step 416.

Step 415, replacing the currently stored black voltage with the computed average value, and going to Step 434.

Step 416, determining whether the computed average value is greater than the currently stored black voltage, if yes, going to Step 420; otherwise, going to Step 417 subsequently.

Step 417, checking for whether flag of white voltage having been collected is set, if yes, going to Step 419; otherwise, going to Step 418 subsequently.

Step 418, storing the currently stored gray voltage as white voltage and setting the flag of white voltage having been collected, replacing the currently stored gray voltage with the currently stored black voltage and replacing the currently stored black voltage with the computed average value and going to Step 434.

Step 419, replacing the currently stored white voltage with the currently stored gray voltage, replacing the currently stored gray voltage with the currently stored black voltage, replacing the currently stored black voltage with the computed average value and going to Step 434.

Step 420, checking for whether flag of white voltage having been collected is set, if yes, going to Step 422; otherwise, going to Step 421 subsequently.

Step 421, storing the currently stored gray voltage as white voltage and setting the flag of white voltage having been collected, replacing the currently stored gray voltage with the computed average value and going to Step 434.

Step 422, replacing the currently stored white voltage with the currently stored gray voltage, replacing the currently gray voltage with the computed average value and going to Step 434.

Step 423 checking for whether flag of white voltage having been collected is set, if yes, going to Step 425; otherwise, going to Step 424 subsequently.

Step 424, storing the computed average value as white voltage and setting the flag of white voltage having been collected and going to Step 434.

Step 425, determining whether difference between the computed average value and the currently stored white voltage is smaller than a predetermined voltage value, if yes, going to Step 426 subsequently; otherwise, going to Step 427.

Step 426, replacing the currently stored white voltage with the computed average value and going to Step 434.

Step 427, determining whether the computed average value is greater than the currently stored white voltage, if yes, going to Step 428 subsequently; otherwise, going to Step 431.

Step 428, checking for whether flag of black voltage having been collected is set, if yes, going to Step 430; otherwise going to Step 429.

Step 429, storing the currently stored gray voltage as black voltage and setting flag of the black voltage having been collected, replacing the currently stored gray voltage with the currently stored white voltage, replacing the currently stored white voltage with the computed average value and going to Step 434.

Step 430, replacing the currently stored black voltage with the currently stored gray voltage, replacing the currently stored gray voltage with the currently stored white voltage, replacing the currently stored white voltage with the computed average value and going to Step 434.

Step 431, checking for whether flag of black voltage having been collected is set, if yes, going to Step 433; otherwise, going to Step 432 subsequently.

Step 432, storing the currently stored gray voltage as black voltage, setting flag of black voltage having been collected, replacing the currently stored gray voltage with the computed average value and going to Step 434.

Step 433, replacing the currently store black voltage with the currently stored gray voltage, replacing the currently stored gray voltage with the computed average value and going to Step 434.

Steps 434-438 are the same as Steps 228-232 and therefore are omitted herein.

Embodiment 5

As shown in FIGS. 11-a and 11-b, a partial self-adaptability method performed by a device is provided in the embodiment of the invention. In the method, the device determines whether the partial self-adaptability time-out is exceeded, if yes, a self-adaptability failure flag is set and a self-adaptability function is quit; otherwise, the following steps are executed.

Steps 501-506 are the same with Steps 201-206 and therefore are omitted herein.

Step 507, determining whether difference between the computed average value and the currently stored black voltage is smaller than a predetermined voltage value, if yes, going to Step 508 subsequently; otherwise, going to Step 509.

Step 508, replacing the currently stored black voltage with the computed average value, setting flag of black voltage having been collected and going to Step 513.

Step 509, determining whether difference between the computed average value and the currently stored gray voltage is smaller than a predetermined voltage value, if yes, going to Step 510 subsequently; otherwise, going to Step 511.

Step 510, replacing the currently stored gray voltage with the computed average value, setting flag of gray voltage having been collected and going to Step 513.

Step 511, determining whether difference between the computed average value and currently stored white voltage is smaller than a predetermined voltage value, if yes, going to Step 512 subsequently; otherwise, quitting the self-adaptability function.

Step 512, replacing the currently stored white voltage with the computed average value, setting flag of white voltage having been collected and going to Step 513.

Step 513, determining whether flag of the black voltage having been collected, flag of gray voltage having been collected and flag of white voltage having been collected are all set, if yes, going to Step 514 subsequently; otherwise, quitting the self-adaptability function.

Step 514, determining whether difference between the currently stored white voltage and gray voltage and difference between the gray voltage and the black voltage are both greater than a predetermined voltage value, if yes, quitting the self-adaptability function; otherwise, going to Step 515 subsequently.

If the device is configured with a flag of precisely collecting gray voltage and if difference between the currently stored white voltage and the gray voltage and difference between the currently stored gray voltage and the black voltage are both greater than a predetermined value, then the step further includes: setting the flag of precisely collecting the gray voltage and setting time-out of precisely collecting gray voltage.

Step 515, determining whether a maximum collecting time is reached, if yes, going to Step 516 subsequently; otherwise, quitting the self-adaptability function.

Specifically in the embodiment, the maximum collecting time is determined by to timer.

Step 516, updating a variable of times of switching resistor and determining whether the updated variable of times of switching resistor is greater than a predetermined value, if yes, setting the self-adaptability failure flag, clearing the currently stored black voltage, gray voltage and white voltage, quitting the self-adaptability function; otherwise, going to Step 517 subsequently.

Specifically in the embodiment, the step of updating the variable of times of switching load resistor includes: updating the variable of times of switching load resistor as the current variable of times of switching load resistor plus 1.

Step 517, checking for status of the load resistor, switching the load resistor according to a predetermined rule and quitting the self-adaptability function.

Preferably in the embodiment, the device is configured with five-level load resistors which are identified as HH, H, M, L, LL in order of high-to-low resistance. When the device is initialized, the load resistor M is set to be conducted and a cycle switching in an order of M-L-LL-H-HH or in an order of M-L-H-LL-HH is performed, which is not limited herein.

In the embodiment, the comparing order of the computed average value with the black voltage, gray voltage and white voltage currently stored in the device is not limited.

Embodiment 6

Figure 12:
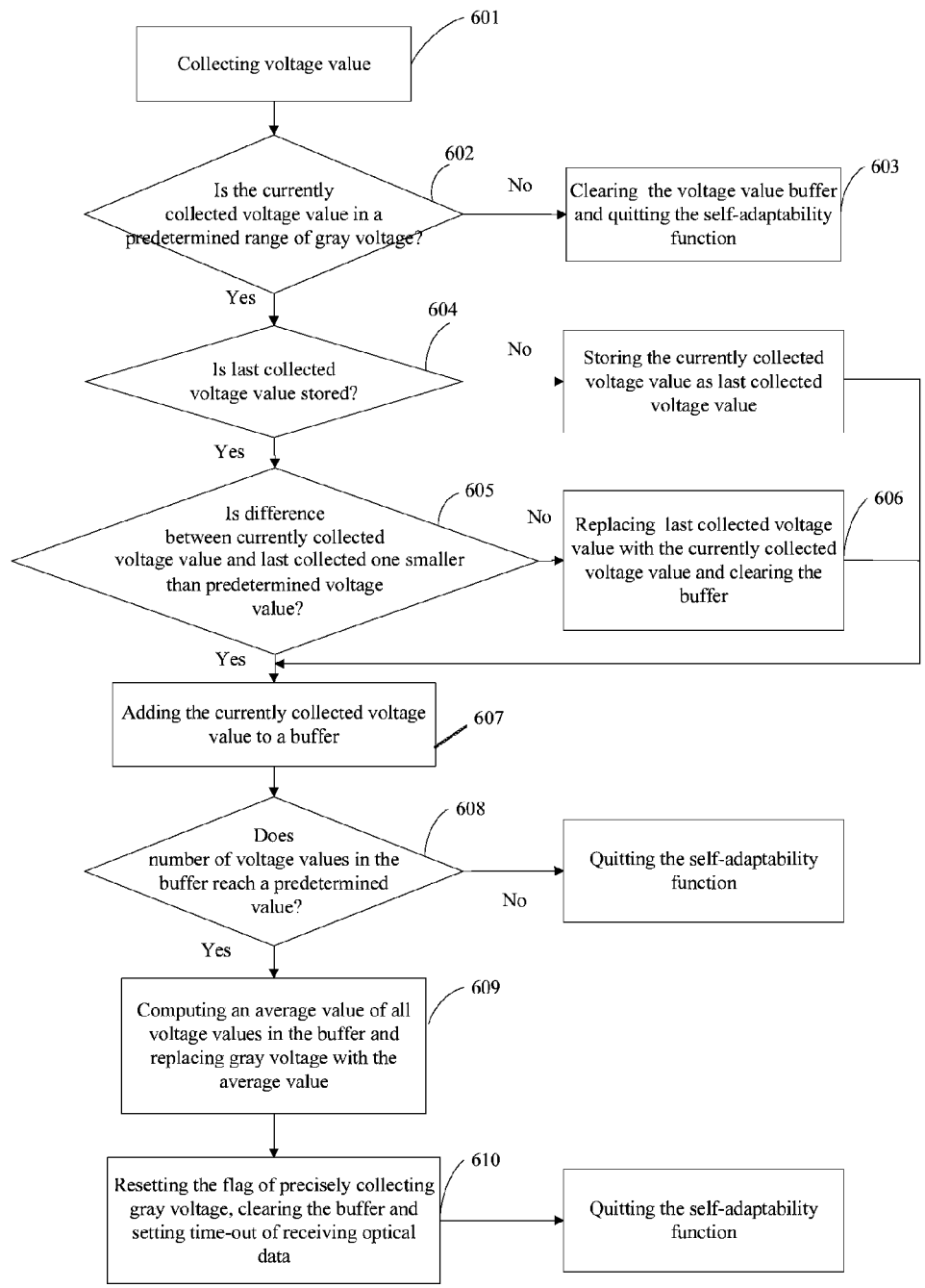
FIG. 12 is a flow chart of a method of precisely collecting gray voltage provided by Embodiment 6 of the invention.

As shown in FIG. 12, a method of precisely collecting gray voltage performed by a device is provided in the embodiment of the invention. In the method, the device determines whether time-out of precisely collecting gray voltage is reached, if yes, a self-adaptability failure flag is set and a self-adaptability function is quit; otherwise, the following steps are executed.

Step 601, collecting voltage value.

Specifically in the embodiment, the step of collecting voltage value includes that the device converts optical signal collected from its screen into electrical signal via a sensor and converts the electrical signal into a digital number, i.e. a voltage value, via an AD converter.

Step 602, determining whether the currently collected voltage value is within a predetermined range of the currently stored gray voltage, if yes, going to Step 604; otherwise, going to Step 603 subsequently.

Specifically, the step of determining whether the currently collected voltage value is within a predetermined range of the currently stored gray voltage includes: determining difference between the currently collected voltage value and the currently stored gray voltage is smaller than a predetermined voltage value, if yes, considering that the currently collected voltage value is within the predetermined range of the gray voltage; otherwise, considering the currently collected voltage value is not within the predetermined range of the gray voltage.

Step 603, clearing a voltage value buffer and quitting a self-adaptability function.

Step 604, determining whether a last collected voltage value is stored in the device, if yes, going to Step 605; otherwise, storing, the currently collected voltage value as last collected voltage value and going to Step 607.

Step 605, determining whether difference between the currently collected voltage value and the last collected voltage value stored in the device is smaller than a predetermined voltage value, if yes, going to Step 607; otherwise, going to Step 606 subsequently.

Step 606, replacing the last collected voltage value stored in the device with the currently collected voltage value, clearing the voltage value buffer and going to Step 607.

Step 607, storing the currently collected voltage value into the voltage value buffer.

Step 608, determining whether number of voltage values stored in the voltage value buffer reaches a predetermined value, if yes, going to Step 609; otherwise, quitting the self-adaptability function.

Preferably, the device is configured with a variable of times, and the step of storing the currently collected voltage value into the voltage value buffer in Step 607 further includes: updating the variable of times to be the current variable of times plus 1, and the step of clearing the voltage value buffer in Steps 603, 606 and 610 further includes: setting the variable of times to be 0; and the step of determining whether number of voltage values stored in the voltage value buffer reaches a predetermined value in Step 608 specifically includes: determining whether the variable of times is not smaller than the predetermined value.

Step 609, computing an average value of all voltage values stored in the voltage value buffer and replacing the currently stored gray voltage with the computed average value.

Step 610, resetting the flag of precisely collecting gray voltage, clearing the voltage value buffer, setting time-out of receiving optical data and quitting the self-adaptability function.

Embodiment 7

Figure 13:
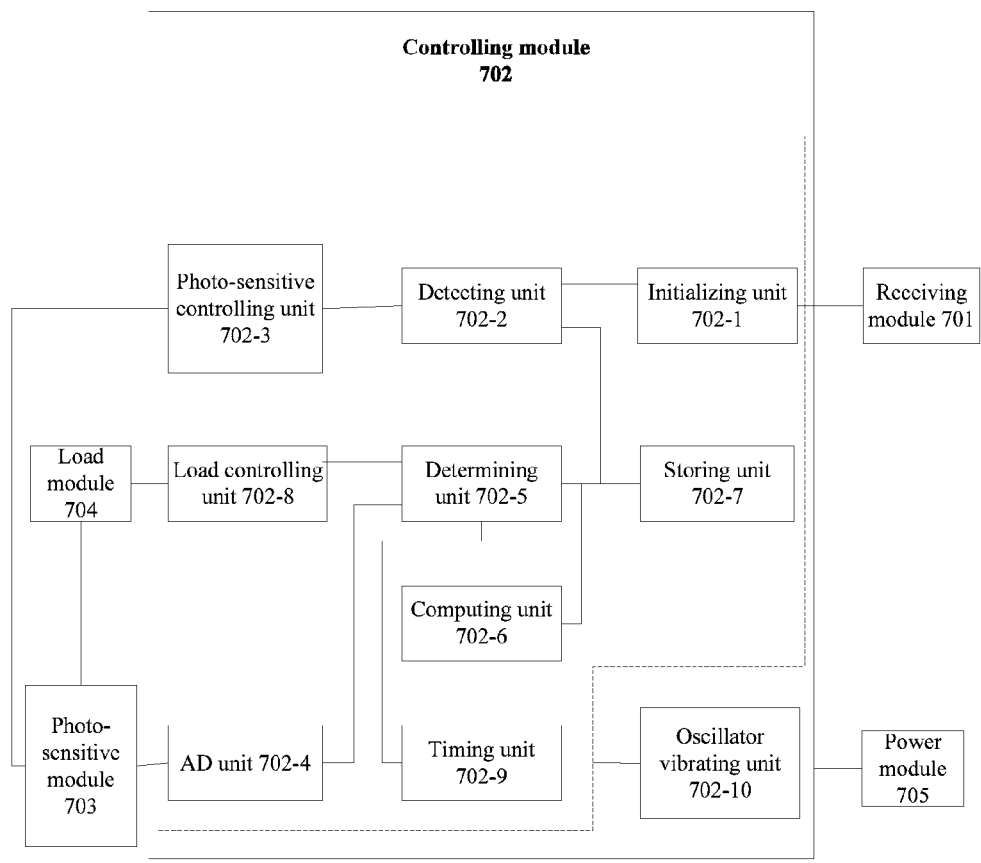
FIG. 13 is a diagram of a device of improving luminous intensity adaptability provided by Embodiment 7 of the invention.

In order to improve luminous intensity adaptability during collecting optical signal by a screen of an optical signal collecting device, a device of improving luminous intensity adaptability during a screen collects optical signal is provided in the embodiment of the invention. As shown in FIG. 13, the device includes a receiving module 701, a controlling module 702, a optical module 703, a load module 704 and a power module 705. Functions of the modules are discussed as below.

The receiving module 701 is configured to receive a request of self-adaptability.

The controlling module 702 is configured to control initializing the device when the receiving module 701 receives the self-adaptability request, and detect whether the device is satisfied with a condition of entering self-adaptability function entry upon finishing initialization, and in case that the device is satisfied with the condition, detect a self-adaptability failure flag, and in case that the self-adaptability failure flag is set, set variables and flags having been modified in process of self-adaptability to be initial values or initial status, prompt error and control shutting off the device; and in case that the self-adaptability failure flag is not set, perform complete self-adaptability;

or control initializing the device when the receiving module 701 receives the self-adaptability request, and to detect whether the device is satisfied with a condition of entering the self-adaptability function entry upon finishing initialization, and in case that the device is satisfied with the condition, check for a self-adaptability failure flag, and in case that the self-adaptability failure flag is set, set variables and flags having been modified in process of self-adaptability to be initial values or initial status, prompt error and control shutting off the device; in case that the self-adaptability failure flag is not set, check for a flag of precisely collecting gray voltage, if the flag of precisely collecting gray voltage is set and time-out of precisely collecting gray voltage is not exceeded, precisely collect the gray voltage; if the flag of precisely collecting gray voltage is not set, perform complete self-adaptability;

or control initializing the device when the receiving module 701 receives the self-adaptability request and detect whether the device is satisfied with a condition of entering the self-adaptability function entry upon finishing initialization, and in case that the device is satisfied with the condition, detect a self-adaptability failure flag, and in case that the self-adaptability failure flag is set, set variables and flags having been modified in process of is self-adaptability to be initial values or initial status, prompt error and control shutting off the device; in case that the self-adaptability failure flag is not set, detect a partial self-adaptability flag, if the partial self-adaptability is set and time-out of partial self-adaptability is reached, reset the partial self-adaptability flag and perform complete self-adaptability setting and perform the complete self-adaptability upon finishing the setting, if the partial self-adaptability flag is set and time-out of partial self-adaptability is not reached, perform partial self-adaptability; if the partial self-adaptability flag is not set, perform complete self-adaptability;

or control initializing the device when the receiving module 701 receives a self-adaptability request, and detect whether the device is satisfied with a condition of entering the self-adaptability function entry upon finishing initialization, and in case that the device is satisfied with the condition, detect a self-adaptability failure flag, and in case that the self-adaptability failure flag is set, set variables and flags having been modified in process of self-adaptability to be initial values or initial status, prompt error and control shutting off the device; and in case that the self-adaptability failure flag is not set, detect a flag of precisely collecting, gray voltage, and in case the flag of precisely collecting gray voltage is set and time-out of precisely collecting gray voltage is not reached, precisely collect gray voltage; in case that the flag, of precisely collecting gray voltage is not set, detect a partial self-adaptability flag, in case the partial self adaptability flag is set and the time-out of partial self-adaptability is reached, reset the partial self-adaptability flag and perform complete self-adaptability upon completing the setting; in case the partial self-adaptability flag is set and the time-out of part-adaptability is not reached, perform the partial self-adaptability; in case that the partial self-adaptability flag is not set, perform complete self-adaptability.

The optical module 703 is configured to collect optical signal.

The load module 704 is configured to provide load for the optical module 703 and switch the load resistor under the control of the controlling module 702.

The power module 705 is configured to supply power to the device.

Specifically, the controlling module 702 includes an initialization unit 702-1, a detecting unit 702-2, a optical controlling unit 702-3, an AD unit 702-4, a determining unit 702-5, a computing unit 702-6, a storing unit 702-7, a load controlling unit 702-8, a timing unit 702-9 and an oscillator unit 702-10. The above units are of functions as below.

The initialization unit 702-1 is configured to control initializing the device after the receiving module 701 receives triggering information.

The detecting module 702-2 is configured to detect whether the device is satisfied with a condition of entering entry of self-adaptability function entry upon finishing initialization and check for a self-adaptability failure flag and a self-adaptability completion flag.

The determining unit 702-5 is configured to determine whether time-out of precisely collecting gray voltage is reached and time-out of partial self-adaptability is reached.

The storing unit 702-7 is configured to store all flags used in the process of self-adaptability.

The timing unit 702-9 is configured to set time-out of precisely collecting gray voltage and time-out of partial self-adaptability.

The oscillator unit 702-10 is configured to provide a reference clock for the device.

The optical controlling unit 702-3, the AD unit 702-4, the computing unit 702-6 and the load controlling unit 702-8 are configured to realize complete self-adaptability, partial self-adaptability and precisely collection of gray voltage.

The above-mentioned embodiments are only preferred embodiments of the invention and all common modifications and substitutions made by a technician skill in the art within the technical solution scope of the invention should fall below the scope of protection of the invention.

What is claimed is:

1. A method for improving luminous intensity adaptability of an optical signal collecting device, wherein the device controls a predetermined load resistor to conduct upon receiving a self-adaptability request, the device collects and sets a voltage upon being satisfied with a predetermined condition, and the load resistor has an influence on collecting of the voltage, the method comprising:

Step a, determining whether a self-adaptability is failed, if yes, restoring modifications on flags, variables and load resistors, prompting error and quitting; otherwise, collecting a voltage value and if the device stores a last collected voltage value, going to Step b; otherwise going to Step c;

Step b, comparing currently collected voltage value with the last collected voltage value, if difference between the currently collected voltage value and the last collected voltage value is smaller than a predetermined voltage value, going to Step c; otherwise replacing the last collected voltage value with the currently collected voltage value, clearing a voltage value buffer and going to Step c;

Step c, adding the currently collected voltage value to the voltage value buffer and determining whether number of voltage values stored in the voltage value buffer reaches a first predetermined voltage value, if yes, going to Step d; otherwise, quitting and waiting for next entering;

Step d, computing an average value of all voltage values stored in the voltage value buffer and determining whether a first voltage is reached, if yes, going to Step e; otherwise storing the computed average value as the first voltage and going to Step f;

Step e, comparing the computed average value with the first voltage stored in the device, if difference between the computed average value and the first voltage is smaller than a second predetermined voltage value, replacing the first voltage stored in the device with the computed average value and going to Step f; if difference between the computed average value and the first voltage is not smaller than the second predetermined voltage value and the first voltage is greater than the computed average value, setting the voltage according to a first predetermined rule and going to Step f; if difference between the computed average value and the first voltage is not smaller than the second predetermined voltage value and the computed average value is greater than the first voltage, setting the voltage according to a second predetermined rule and going to Step f;

Step f, determining whether the first voltage, a second voltage and a third voltage are all collected, if yes, going to Step g; otherwise, quitting and waiting for next entering;

Step g, determining whether the first voltage, the second voltage and the third voltage stored in the device are all satisfied with a predetermined requirement, if yes, quitting and the device waiting for receiving data; otherwise going to Step h; and Step h, determining whether a predetermined condition of switching resistor is satisfied, if yes, checking for status of a current load resistor, switching into a next load resistor according to a third predetermined rule, quitting and waiting for next entering and collecting voltage according to the next load resistor; otherwise, the self-adaptability being failed, clearing the first voltage, the second voltage and the third voltage stored in the device and quitting; wherein the predetermined condition of switching resistor is that times of switching resistor does not reach the second predetermined voltage value.

2. The method of claim 1, wherein the device stores the first voltage, the second voltage and the third voltage in a high-to-low voltage value order of, the third voltage, the second voltage and the first voltage, correspondingly, the setting voltage according to a first predetermined rule comprises:
(1) determining whether the second voltage is collected, if yes, going to (2); otherwise replacing the first voltage stored in the device with the computed average value, storing the first voltage stored in the device as the second voltage and going to Step f; and
(2) determining whether the third voltage is collected, if yes, replacing the third voltage stored in the device with the second voltage stored in the device and replacing the second voltage stored in the device with the first voltage stored in the device and replacing the first voltage stored in the device with the computed average value and going to Step f;
otherwise, storing the second voltage stored in the device as the third voltage and replacing the second voltage stored in the device with the first voltage stored in the device and replacing the first voltage stored in the device with the computed average value and going to Step f;

the setting voltage according to a second predetermined rule comprises:

(1) determining whether the second voltage is collected, if yes, going to (2); otherwise, storing the computed average value as the second voltage and going to Step f;
(2) comparing the computed average value with the second voltage stored in the device, if difference between the two values is smaller than the second predetermined voltage value, replacing the second voltage stored in the device with the computed average value and going to Step f; if difference between the two values is not smaller than the second predetermined voltage value and the second voltage value stored in the device is greater, going to (3) subsequently; and if difference between the two values is not smaller than the second predetermined voltage value and the computed average value is greater, going to (4);
(3) determining whether the third voltage is collected, if yes, replacing the third voltage stored in the device with the second voltage stored in the device and replacing the second voltage stored in the device with the computed average value and going to Step f; otherwise, storing the second voltage stored in the device as the third voltage and replacing the second voltage stored in the device with the computed average value and going to Step f; and
(4) determining whether the third voltage is collected, if yes, replacing the third voltage stored in the device with the computed average value and going to Step f; otherwise, storing the computed average value as the third voltage and going to Step f;

and the predetermined requirement is that both difference between the third voltage stored in the device and the second voltage stored in the device and difference between the second voltage stored in the device and the first voltage stored in the device are greater than a third predetermined voltage value.

3. The method of claim 1, wherein the device stores the first voltage, the second voltage and the third voltage in a high-to-low voltage value order of, the third voltage, the first voltage and the second voltage, correspondingly, the setting voltage according to a first predetermined rule comprises:
(1) determining whether the second voltage is collected, if yes, going to (2); otherwise, storing the computed average value as the second voltage and going to Step f;
(2) comparing the computed average value with the second voltage stored in the device, if difference between the two values is smaller than the second predetermined voltage value, replacing the second voltage stored in the device with the computed average value and going to Step f; if difference between the two values is not smaller than the second predetermined voltage value and the later is greater, going to (3) subsequently; if difference between the two values is not smaller than the second predetermined voltage value and the former is greater, going to (4);
(3) determining whether the third voltage is collected, if yes, replacing the third voltage stored in the device with the first voltage stored in the device and replacing the first voltage stored in the device with the second voltage stored in the device and replacing the second voltage stored in the device with the computed average value and going to Step f; otherwise, storing the first voltage stored in the device as the third voltage and replacing the first voltage stored in the device with the second voltage stored in the device and replacing the second voltage stored in the device with the computed average value and going to Step f; and (4) determining whether the third voltage is collected, if yes, replacing the third voltage stored in the device with the first voltage stored in the device and replacing the first voltage stored in the device with the computed average value and going to Step f; otherwise, storing the first voltage stored in the device as the third voltage and replacing the first voltage stored in the device with the computed average value and going to Step f;

the setting voltage according to a second predetermined rule comprises:
(1) determining whether the third voltage is collected, if yes, going to (2); otherwise storing the computed average value as the third voltage and going to Step f;
(2) comparing the computed average value with the third voltage stored in the device, if difference between the two values is smaller than the second predetermined voltage value, replacing the third voltage stored in the device with the computed average value; if difference between the two values is not smaller than the second predetermined voltage value and the later is greater, going to (3) subsequently; if difference between the two values is not smaller than the second predetermined voltage value and the former is greater, going to (4);
(3) determining whether the second voltage is collected, if yes, replacing the second voltage stored in the device with the first voltage stored in the device and replacing the first voltage stored in the device with the computed average value and going to Step f; otherwise, storing the first voltage stored in the device as the second voltage and replacing the first voltage stored in the device with the computed average value and going to Step f; and
(4) determining whether the second voltage is collected, if yes, replacing the second voltage stored in the device with the first voltage stored in the device and replacing the first voltage stored in the device with the third voltage stored in the device and replacing the third voltage stored in the device with the computed average value and going to Step f; otherwise, storing the first voltage stored in the device as the second voltage and replacing the first voltage stored in the device with the third voltage stored in the device and replacing the third voltage stored in the device with the computed average value and going to Step f;
and the predetermined requirement is that both difference between the third voltage stored in the device and the first voltage stored in the device and difference between the first voltage stored in the device and the second voltage stored in the device are greater than a third predetermined voltage value.

4. The method of claim 1, wherein the device stores the first voltage, the second voltage and the third voltage in a high-to-low voltage value order of the first voltage, the second voltage and the third voltage, correspondingly,
the setting voltage according to the first predetermined rule comprises:
(1) determining whether the second voltage is collected, if yes, going to (2); otherwise, storing the computed average value as the second voltage and going to Step f;
(2) comparing the computed average value with the second voltage stored in the device, if difference between the two values is smaller than the second predetermined voltage value, replacing the second voltage stored in the device with the computed average value; if difference between the two values is not smaller than the second voltage value and the later is greater, going to (3) subsequently; if difference between the two values is not smaller than the second predetermined voltage value and the former is greater, going to (4);
(3) determining whether the third voltage is collected, if yes, replacing the third voltage stored in the device with the computed average value, going to Step f; otherwise, storing the computed average value as the third voltage and going to Step f; and
(4) determining whether the third voltage is collected, if yes, replacing the third voltage stored in the device with the second voltage stored in the device and replacing the second voltage stored in the device with the computed average value and going to Step f; otherwise, storing the second voltage stored in the device as the third voltage and replacing the second voltage stored in the device with the computed average value and going to Step f;
the setting voltage according to a second predetermined rule comprises:
(1) determining whether the second voltage is collected, if yes, going to (2); otherwise, storing the first voltage stored in the device as the second voltage and replacing the first voltage stored in the device with the computed average value and going to Step f; and
(2) determining whether the third voltage is collected, if yes, replacing the third voltage stored in the device with the second voltage stored in the device, replacing the second voltage stored in the device with the first voltage stored in the device, replacing the first voltage stored in the device with the computed average value and going to Step f; otherwise, storing the second voltage stored in the device as the third voltage, replacing the second voltage stored in the device with the first voltage stored in the device, replacing the first voltage stored in the device with the computed average value and going to Step f;
and the predetermined requirement is that both difference between the first voltage stored in the device and the second voltage stored in the device and difference between the second voltage stored in the device and the third voltage stored in the device are greater than a third predetermined voltage value.

5. The method of claim 1, wherein the device is configured with a partial self-adaptability flag and the partial self-adaptability flag is checked for in case of a successful self-adaptability;
if the partial self-adaptability is not set, the method comprises:
(1) collecting voltage value, if the device stores the last collected voltage value, going to (2); otherwise, going to (3);
(2) comparing the currently collected voltage value with the last collected voltage value, if difference between the two values is smaller than the first predetermined voltage value, going to (3); otherwise, replacing the last collected voltage value with the currently collected voltage value, clearing the voltage value buffer, quitting and waiting for next entering;
(3) adding the currently collected voltage value to the voltage value buffer and determining whether number of voltage values stored in the voltage value buffer reaches the first predetermined value, if yes, going to (4); otherwise, quitting and waiting for next entering;
(4) computing the average value of all voltage values stored in the voltage value buffer and determining whether the first voltage is collected, if yes, going to (5); otherwise, storing the computed average value as the first voltage and going to (6);

(5) comparing the computed average value with the first voltage stored in the device, if difference between the two values is smaller than the second predetermined voltage value, replacing the first voltage stored in the device with the computed average value and going to (6); if difference between the two values is not smaller than the second predetermined voltage value and the later is greater, setting voltage according to the first predetermined rule and going to (6); if difference between the two values is not smaller than the second predetermined voltage value and the former is greater, setting voltage according to the second predetermined rule and going to (6);

(6) determining whether the first voltage, the second voltage and the third voltage are all collected, if yes, going to (7); otherwise, quitting and waiting for next entering;

(7) determining whether the first voltage, the second voltage and the third voltage stored in the device are all satisfied with the predetermined requirement, if yes, setting the partial self-adaptability flag, setting a time-out of the partial self-adaptability, quitting and the device waiting for receiving data; otherwise, going to (8); wherein the predetermined requirement is that among the first voltage, the second voltage and the third voltage, difference between the middle-valued voltage and the smallest-valued voltage and difference between the largest-valued voltage and the middle-valued voltage are all greater than a third predetermined voltage value; and (8) determining whether the predetermined resistor-switching condition is satisfied with, if yes, checking for status of the current load resistor, switching into the next load resistor according to the predetermined rule, quitting, waiting for next entering and collecting voltage according to the next load resistor; otherwise, the self-adaptability being failed, quitting; wherein the predetermined resistor switching condition is that times of switching the resistor does not reach the second predetermined value;

if the partial self-adaptability is set, the method comprises:

(1) determining whether time-out of the partial self-adaptability is exceeded, if yes, the self-adaptability being failed and quitting; otherwise, collecting voltage value, and if the device stores the last collected voltage value, going to (2); otherwise, going to (3);

(2) comparing the currently collected voltage value with the last connected voltage value, if difference between the two values is smaller than the first predetermined voltage value, going to (3); otherwise, replacing the last collected voltage value with the currently collected voltage value, clearing the voltage value buffer and going to (3);

(3) adding the currently collected voltage value to the voltage value buffer and determining whether number of voltage values stored in the voltage value buffer reaches the third predetermined value, if yes, going to (4); otherwise, quitting and waiting for next entering;

(4) computing the average value of all voltage values stored in the voltage value buffer, comparing the computed average value with the first voltage stored in the device, if difference between the two values is smaller than the second predetermined voltage value, replacing the first voltage stored in the device with the computed average value and going to (7); otherwise, going to (5);

(5) comparing the computed average value with the second voltage stored in the device, if difference between the two values is smaller than the second predetermined voltage value, replacing the second voltage stored in the device with the computed average value and going to (7); otherwise, going to (6);

(6) comparing the computed average value with the third voltage stored in the device, if difference between the two values is smaller than the second predetermined voltage value, replacing the third voltage stored in the device with the computed average value and going to (7); otherwise, discarding the computed average value, quitting and waiting for next entering;

(7) determining whether the first voltage, the second voltage and the third voltage are all collected, if yes, going to (8); otherwise, quitting and waiting for next entering;

(8) determining whether the first voltage, the second voltage and the third voltage stored in the device are all satisfied with the predetermined requirement, if yes, quitting and the device waiting for receiving data; otherwise, going to (9); wherein the predetermined requirement is that among the first voltage, second voltage and third voltage stored in the device, difference between the middle-valued voltage and the smallest-valued voltage and difference between the largest-valued voltage and the middle-valued voltage are both greater than a third predetermined voltage value; and (9) determining whether the predetermined condition of switching resistor is satisfied with, if yes, checking for status of the current load resistor, switching into next load resistor according to the predetermined rule, quitting and waiting for next entering; otherwise, the self-adaptability being failed and quitting; in which the predetermined condition of switching resistor is that times of switching resistor does not reach a fourth predetermined value.

6. The method of claim 1, wherein the device is configured with a flag of precisely collecting gray voltage, and if the self-adaptability is not failed, the method comprises checking for the flag of precisely collecting gray voltage;

if the flag of precisely collecting gray voltage is not set, the method comprises:

(1) collecting voltage value and if the device stores the last collected voltage value, going to (2); otherwise, going to (3);

(2) comparing the currently collected voltage value with the last collected voltage value, if difference between the two values is smaller than the first predetermined voltage value, going to (3); otherwise, replacing the last collected voltage value with the currently collected voltage value, clearing the voltage value buffer and going to (3);

(3) storing the currently collected voltage value in the voltage value buffer and determining whether number of voltage values stored in the voltage value buffer reaches the first predetermined value, if yes, going to (4); otherwise, quitting and waiting for next entering;

(4) computing the average value of all voltage values stored in the voltage value buffer and determining whether the first voltage is collected, if yes, going to (5); otherwise, storing the computed average value as the first voltage and going to (6);

(5) comparing the computed average value with the first voltage stored in the device, if difference between the two values is smaller than the second predetermined voltage value, replacing the first voltage stored in the device with the computed average value and going to (6); if difference between the two values is not smaller than the second predetermined voltage value and the later is greater, setting voltage according to the first predetermined rule and going to (6); if difference between the two values is not smaller than the second predetermined voltage value and the former is greater, setting voltage according to the second predetermined rule and going to (6);

(6) determining whether the first voltage, the second voltage and the third voltage are all collected, if yes, going to (7); otherwise, quitting and waiting for next entering;

(7) determining whether the first voltage, the second voltage and the third voltage stored in the device are all satisfied with the predetermined requirement, if yes, setting the flag of precisely collecting gray voltage, setting time-out of precisely collecting gray voltage, quitting and waiting for next entering; otherwise, going to (8); wherein the predetermined requirement is that among the first voltage, second voltage and third voltage stored in the device, difference between the middle-valued voltage and the smallest-valued voltage and difference between the largest-valued voltage and the middle-valued voltage are both greater than a third predetermined voltage value; and (8) determining whether the predetermined condition of switching resistor is satisfied with, if yes, checking for status of the current load resistor, switching into next load resistor according to the predetermined rule, quitting, waiting for next entering and collecting voltage according to the next load resistor; otherwise, the self-adaptability being failed and quitting; wherein the predetermined condition of switching resistor is that times of switching resistor does not reach the second predetermined value;

if the flag of precisely collecting gray voltage is set, the method comprises:

(1) determining whether time-out of precisely collecting gray voltage is reached, if yes, the self-adaptability being failed and quitting; otherwise, going to (2);

(2) collecting voltage value and determining whether difference between the currently collected voltage value and a predetermined voltage stored in the device is smaller than a fourth predetermined voltage value, if yes, going to (3); otherwise, quitting and waiting for next entering; wherein the predetermined voltage stored in the device is the middle-valued voltage among the first voltage, the second voltage and the third voltage stored in the device;

(3) if the device stores the last collected voltage value, going to (4); otherwise, going to (5);

(4) comparing the currently collected voltage value with the last collected voltage value, if difference between the two values is smaller than the first predetermined voltage value, going to (5); otherwise, replacing the voltage value last collected by the device with the currently collected voltage value, clearing the voltage value buffer and going to (5);

(5) storing the currently collected voltage value in the voltage value buffer and determining whether number of voltage values stored in the voltage value buffer reaches a fifth predetermined value, if yes, going to (6); otherwise, quitting and waiting for next entering; and (6) computing the average value of all voltage values stored in the voltage value buffer, replacing predetermined voltage stored in the device with the computed average value, resetting the flag of precisely collecting gray voltage and quitting, the device waiting for receiving data.

7. The method of claim 1, wherein the device sets a partial self-adaptability flag and a flag of precisely collecting gray voltage and in case that the self-adaptability is not failed, the method comprises checking for the flag of precisely collecting gray voltage, if the flag of precisely collecting gray voltage is set, the method comprises (1) determining whether time-out of precisely collecting gray voltage is reached, if yes, the self-adaptability being failed and quitting; otherwise, going to (2);

(2) collecting voltage value and determining whether difference between the currently collected voltage value and the predetermined voltage stored in the device is smaller than a fourth predetermined voltage value, if yes, going to (3); otherwise, quitting and waiting for next entering, wherein the predetermined voltage stored in the device is a middle-value voltage among the first voltage, the second voltage and the third voltage stored in the device;

(3) if the device stores the last collected voltage value, going to (4); otherwise, going to (5);

(4) comparing the currently collected voltage value with the last collected voltage value, if difference between the two values is smaller than the first predetermined voltage value, going to (5); otherwise, replacing the last collected voltage value with the currently collected voltage value, clearing the voltage value buffer and going to (5);

(5) storing the currently collected voltage value in the voltage value buffer and determining whether number of voltage values stored in the voltage value buffer reaches a fifth predetermined value, if yes, going to (6); otherwise, quitting and waiting for next entering; and (6) computing the average value of all voltage values stored in the voltage value buffer, replacing the predetermined voltage stored in the device with the computed average value, resetting the flag of precisely collecting gray voltage and quitting, the device waiting for receiving data;

in case that the flag of precisely collecting gray voltage is not set, the method comprises checking for the part self-adaptability flag, in case that the flag of precisely collecting gray voltage is set, the method comprises:

(1) determining whether time-out of the partial self-adaptability is reached, if yes, the self-adaptability being failed, quitting and waiting for next entering; otherwise, collecting voltage value and if the device stores the last collected voltage value, going to (2); otherwise, going to (3);

(2) comparing the currently collected voltage value with the last collected voltage value, if difference between the two values is smaller than the first predetermined voltage value, going to (3); otherwise, replacing the last collected voltage value with the currently collected voltage value, clearing the voltage value buffer and going to (3);

(3) storing the currently collected voltage value in the voltage value buffer and determining whether number of voltage values stored in the voltage value buffer reaches the third predetermined value, if yes, going to (4); otherwise, quitting and waiting for next entering;

(4) computing the average value of all voltage values stored in the voltage value buffer, comparing the computed average value with the first voltage stored in the device, if difference between the two values is smaller than the second predetermined voltage value, replacing the first voltage stored in the device with the computed average value and going to (7); otherwise, going to (5);

(5) comparing the computed average value with the second voltage stored in the device, if difference between the two values is smaller than the second predetermined voltage value, replacing the second voltage stored in the device with the computed average value and going to (7); otherwise, going to (6);

(6) comparing the computed average value with the third voltage stored in the device, if difference between the two values is smaller than the second predetermined voltage value, replacing the third voltage stored in the device with the computed average value and going to (7); otherwise, discarding the computed average value, quitting and waiting for next entering;

(7) determining whether the first voltage, second voltage and third voltage is all collected, if yes, going to (8); otherwise, quitting and waiting for next entering;

(8) determining whether the first voltage, the second voltage and the third voltage stored in the device are all satisfied with the predetermined requirement, if yes, quitting and waiting for next entering; otherwise, going to (9); and (9) determining whether the predetermined condition of switching resistor is satisfied with, if yes, checking for status of the current load resistor, switching into next load resistor according to the predetermined rule, quitting and waiting for next entering; otherwise, setting the self-adaptability failure flag and quitting; wherein the predetermined resistor switching condition is that times of switching resistor does not reach a fourth predetermined value;

in case that the part self-adaptability flag is not set, the method comprises:

(1) collecting voltage value and if the device stores the last collected voltage value, going to (2); otherwise, going to (3);

(2) comparing the currently collected voltage value with the last collected voltage value, if difference between the two values is smaller than the first predetermined voltage value, going to (3); otherwise, replacing the last collected voltage value with the currently collected voltage value, clearing the voltage value buffer, quitting and waiting for next entering;

(3) storing the currently collected voltage value in the voltage value buffer and determining whether number of voltage values stored in the voltage value buffer reaches the first predetermined value, if yes, going to (4); otherwise, quitting and waiting for next entering;

(4) computing the average value of all voltage values stored in the voltage value buffer and determining whether the first voltage is collected, if yes, going to (5); otherwise, storing the computed average value as the first voltage and going to (6);

(5) comparing the computed average value with the first voltage stored in the device and if difference between the two values is smaller than the second predetermined voltage value, replacing the first voltage value stored in the device with the computed average value and going to (6); if difference between the two values is not smaller than the second predetermined voltage value and the later is greater, setting voltage according to the first predetermined rule and going to (6); if difference between the two values is not smaller than the second predetermined voltage value and the former is greater, setting voltage according to the second predetermined rule and going to (6);

(6) determining whether the first voltage, the second voltage and the third voltage are all collected, if yes, going to (7); otherwise, quitting and waiting for next entering;

(7) determining whether the first voltage, the second voltage and the third voltage are all satisfied with the predetermined requirement, if yes, setting the partial self-adaptability flag and the flag of precisely collecting gray voltage, setting the time-out of the part self-adaptability and the time-out of the precisely collecting gray voltage and quitting, the device waiting for receiving data; otherwise, going to (8); wherein the predetermined requirement is that among the first voltage, second voltage and third voltage, difference between the middle-valued voltage and the smallest-valued voltage and difference between the largest-valued voltage and the middle-valued voltage is both greater than a third predetermined voltage value; and (8) determining whether the predetermined condition of switching resistor is satisfied, if yes, checking for status of the current load resistor, switching into next load resistor according to the predetermined rule, quitting and waiting for next entering and collecting voltage according to the next load resistor; otherwise, the self-adaptability being failed and quitting; wherein the predetermined condition of switching resistor is that times of switching resistor does not reach the second predetermined value.

* * * * *